US012363306B2

(12) United States Patent
Chen et al.

(10) Patent No.: US 12,363,306 B2
(45) Date of Patent: Jul. 15, 2025

(54) MMVD MERGE MODE WITH ASYMMETRIC MOTION VECTOR DIFFERENCE

(71) Applicant: QUALCOMM Incorporated, San Diego, CA (US)

(72) Inventors: Chun-Chi Chen, San Diego, CA (US); Han Huang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 73 days.

(21) Appl. No.: 18/305,807

(22) Filed: Apr. 24, 2023

(65) Prior Publication Data
US 2023/0370605 A1   Nov. 16, 2023

Related U.S. Application Data

(60) Provisional application No. 63/365,081, filed on May 20, 2022, provisional application No. 63/364,672, filed on May 13, 2022.

(51) Int. Cl.
*H04N 19/137*   (2014.01)
*H04N 19/105*   (2014.01)
(Continued)

(52) U.S. Cl.
CPC ......... *H04N 19/137* (2014.11); *H04N 19/105* (2014.11); *H04N 19/176* (2014.11); *H04N 19/70* (2014.11)

(58) Field of Classification Search
CPC .. H04N 19/137; H04N 19/105; H04N 19/176; H04N 19/70; H04N 19/52
See application file for complete search history.

(56) References Cited

U.S. PATENT DOCUMENTS

2020/0275117 A1* 8/2020 Jeong ..................... H04N 19/52
2020/0366902 A1* 11/2020 Jeong .................... H04N 19/184
(Continued)

OTHER PUBLICATIONS

JVET-R0357-WD (Year: 2020).*
(Continued)

*Primary Examiner* — Shadan E Haghani
(74) *Attorney, Agent, or Firm* — Shumaker & Sieffert, P.A.

(57) ABSTRACT

An example device for decoding video data includes one or more processors configured to determine merge mode information for a current block, the merge mode information indicating that motion information for a current block is to be predicted using a first predictor motion vector and a second predictor motion vector; determine a first motion vector difference (MVD) for the first predictor motion vector and a second MVD for the second predictor motion vector, the second MVD being different than the first MVD; form a first motion vector equaling a combination of the first motion vector predictor and the first MVD; form a second motion vector equaling a combination of the second motion vector predictor and the second MVD; generate a prediction block using the first motion vector and the second motion vector; and decode the current block using the prediction block.

20 Claims, 12 Drawing Sheets

(51) Int. Cl.
    *H04N 19/176*    (2014.01)
    *H04N 19/70*    (2014.01)

(56) References Cited

U.S. PATENT DOCUMENTS

| | | | |
|---|---|---|---|
| 2020/0389656 A1 | 12/2020 | Huang et al. | |
| 2020/0404253 A1 | 12/2020 | Chen et al. | |
| 2022/0132137 A1 | 4/2022 | Jang | |
| 2022/0174286 A1* | 6/2022 | Lee | H04N 19/176 |

OTHER PUBLICATIONS

This is only the first 100 pages of the document. They document was too large to be converted to PDF for upload into the docket. Please access the document directly through https://www.jvet-experts.org/.*

Bross B., et al., "Versatile Video Coding Editorial Refinements on Draft 10", JVET-T2001-v2, 20th JVET Meeting, Oct. 7, 2020-Oct. 16, 2020, Teleconference, (The Joint Video Experts Team of ITU-T SG 16 WP 3 and ISO/IEC JTC 1/SC 29), Nov. 24, 2020, pp. 1-515, XP030293334, cited in the application section 9.3.3.2.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, Jan. 1, 2012, 20 Pages.

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, No. JCTVC-N1003_v1, 14th Meeting, Vienna, AT, Jul. 25-Aug. 2, 2013, 311 Pages, Please consider section 8.5.3.2.6 on p. 125, section 8.5.3.2.7 on pp. 126-129, and section 8.5.3.2.8 on pp. 129 and 130.

CHIEN., et al., "Motion Vector Coding and Block Merging in Versatile Video Coding Standard", IEEE Transactions on Circuits and Systems for Video Technology, Jan. 1, 2021, pp. 1-15, XP055842665, USA ISSN: 1051-8215, DOI:10.1109/TCSVT.2021.3101212.

International Search Report and Written Opinion—PCT/US2023/019796—ISA/EPO—Aug. 9, 2023, 14 Pages.

* cited by examiner

| Merge Index | L0 MV | L1 MV |
|---|---|---|
| 0 | x |  |
| 1 |  | x |
| 2 | x |  |
| 3 |  | x |
| 4 | x |  |

FIG. 7

MMVD MERGE MODE WITH ASYMMETRIC MOTION VECTOR DIFFERENCE

This application claims the benefit of U.S. Provisional Patent Application 63/364,672, filed May 13, 2022, and U.S. Provisional Patent Application No. 63/365,081, filed May 20, 2022, the entire contents of each of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra picture) prediction and/or temporal (inter picture) prediction to reduce or remove redundancy inherent in video sequences. For block-based video coding, a video slice or a video tile (e.g., a video picture or a portion of a video picture) may be partitioned into video blocks, which may also be referred to as coding blocks, superblocks, coding tree units (CTUs), coding units (CUs) and/or coding nodes. Video blocks in an intra coded (I) slice of a picture are encoded using spatial prediction with respect to reference samples (also called prediction samples) in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to merge mode with Motion Vector Difference (MMVD) that may provide a more flexible syntax-wise option for MMVD to indicate a motion vector difference in a bitstream. The techniques of this disclosure may be applied to any of the existing video codecs, such as HEVC (High Efficiency Video Coding), VVC (Versatile Video Coding), Essential Video Coding (EVC) or be an efficient coding tool in future video coding standards (e.g., ECM (Enhanced Compression Model)).

In one example, a method of decoding video data, the method including determining (e.g., encoding or decoding) merge mode information for a current block, the merge mode information indicating that motion information for a current block is to be predicted using a first predictor motion vector and a second predictor motion vector; determining a first motion vector difference (MVD) for the first predictor motion vector and a second MVD for the second predictor motion vector, the second MVD being different than the first MVD; forming a first motion vector, the first motion vector corresponding to a combination of the first motion vector predictor and the first MVD; forming a second motion vector, the second motion vector corresponding to a combination of the second motion vector predictor and the second MVD; generating a prediction block using the first motion vector and the second motion vector; and decoding the current block using the prediction block.

In another example, a device for decoding video data includes a memory configured to store video data; and one or more processors implemented in circuitry and configured to: determine (e.g., encode or decode) merge mode information for a current block of the video data, the merge mode information indicating that motion information for a current block is to be predicted using a first predictor motion vector and a second predictor motion vector; determine a first motion vector difference (MVD) for the first predictor motion vector and a second MVD for the second predictor motion vector, the second MVD being different than the first MVD; form a first motion vector, the first motion vector corresponding to a combination of the first motion vector predictor and the first MVD; form a second motion vector, the second motion vector corresponding to a combination of the second motion vector predictor and the second MVD; generate a prediction block using the first motion vector and the second motion vector; and decode the current block using the prediction block.

In another example, a computer-readable storage medium has stored thereon instructions that, when executed, cause a processor to: determine (e.g., encode or decode) merge mode information for a current block, the merge mode information indicating that motion information for a current block is to be predicted using a first predictor motion vector and a second predictor motion vector; determine a first motion vector difference (MVD) for the first predictor motion vector and a second MVD for the second predictor motion vector, the second MVD being different than the first MVD; form a first motion vector, the first motion vector corresponding to a combination of the first motion vector predictor and the first MVD; form a second motion vector, the second motion vector corresponding to a combination of the second motion vector predictor and the second MVD; generate a prediction block using the first motion vector and the second motion vector; and decode the current block using the prediction block.

In another example, a device for decoding video data includes means for determining (e.g., encoding or decoding) merge mode information for a current block, the merge mode information indicating that motion information for a current block is to be predicted using a first predictor motion vector and a second predictor motion vector; means for determining a first motion vector difference (MVD) for the first predictor motion vector and a second MVD for the second predictor motion vector, the second MVD being different than the first MVD; means for forming a first motion vector, the first motion vector corresponding to a combination of the first motion vector predictor and the first MVD; means for forming a second motion vector, the second motion vector corresponding to a combination of the second motion vector predictor and the second MVD; means for generating a prediction block using the first motion vector and the second motion vector; and means for decoding the current block using the prediction block.

The details of one or more examples are set forth in the accompanying drawings and the description below. Other features, objects, and advantages will be apparent from the description, drawings, and claims.

BRIEF DESCRIPTION OF DRAWINGS

FIG. 7 is a table illustrating example merge indices and motion vector candidate lists for geometric partition mode.

DETAILED DESCRIPTION

Figure 1:
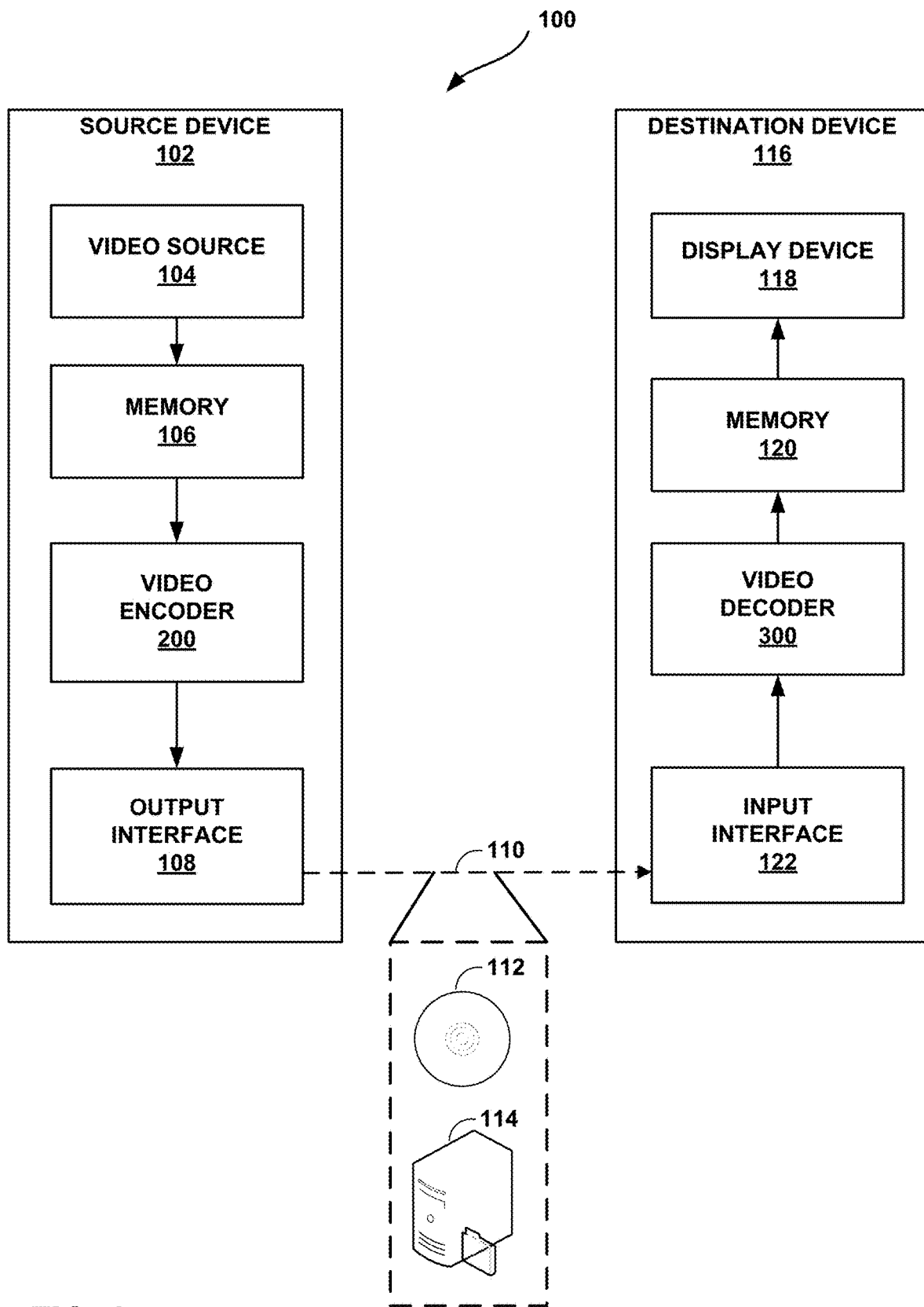
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for Merge Mode with Motion Vector Difference (MMVD) merge mode with asymmetric motion vector differences. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for MMVD merge mode with asymmetric motion vector differences. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

In some examples of the disclosure, video encoder 200 and video decoder 300 may operate according to a video coding format, such as AOMedia Video 1 (AV1) or extensions thereto, as well as successor coding formats (e.g., AV2) that may currently be in development or will be forthcoming. In other examples, video encoder 200 and video decoder 300 may operate according to other proprietary or industry standards. The techniques of this disclosure, however, are not limited to any particular coding standard and/or video coding format. In general, video encoder 200 and video decoder 300 may be configured to perform the techniques of this disclosure in conjunction with any video coding techniques that use MMVD merge mode with asymmetric motion vector differences.

In some examples, Video encoder 200 and video decoder 300 may operate according to a video coding formats, such as ITU-T H.265, also referred to as High Efficiency Video Coding (HEVC) or extensions thereto, such as the multi-view and/or scalable video coding extensions. An HEVC draft specification, and referred to as HEVC WD hereinafter, is available from http://phenix.int-evry.fr/jct/doc_end_user/documents/14_Vienna/wg11/JCTVC-N1003-v1.zip. Alternatively, video encoder 200 and video decoder 300 may operate according to other proprietary or industry standards, such as ITU-T H.266, also referred to as Versatile Video Coding (VVC). A draft of VVC is described in Bross, et al. "Versatile Video Coding (Draft 10)," Joint Video Experts Team (WET) of ITU-T SG 16 WP 3 and ISO/IEC JTC 1/SC 29/WG 11, 18$^{th}$ Meeting: by teleconference, 22 Jun.-1 Jul. 2020, JVET-T2001 (hereinafter "VVC Draft 10"). Algorithm description of Versatile Video Coding and Test Model 10 (VTM 10.0) could be referred to JVET-T2002. The techniques of this disclosure, however, are not limited to any particular coding format.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

This disclosure may use "N×N" and "N by N" interchangeably to refer to the sample dimensions of a block (such as a coding block, superblock, or other block of video data) in terms of vertical and horizontal dimensions, e.g., 16×16 samples or 16 by 16 samples. In general, a 16×16 coding block will have 16 samples in a vertical direction (y=16) and 16 samples in a horizontal direction (x=16). Likewise, an N×N coding block generally has N samples in a vertical direction and N samples in a horizontal direction, where N represents a nonnegative integer value. The samples in a coding block may be arranged in rows and columns. Moreover, coding blocks need not necessarily have the same number of samples in the horizontal direction as in the vertical direction (i.e., the coding block may be non-square). For example, coding blocks may comprise N×M samples, where M is not necessarily equal to N.

When operating according to the AV1 codec, video encoder 200 and video decoder 300 may be configure to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of the block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding enables parallel processing and multi-threading for encoder and decoder implementations.

In some examples, a coding block includes a coding bock of luma samples and two coding blocks of corresponding chroma samples for a picture that has three sample arrays. In other examples, a coding block comprises a single coding block of luma samples (e.g., for a monochrome picture). AV1 supports 4:0:0 chroma subsampling (e.g., monochrome), 4:2:0 chroma subsampling, 4:2:2 chroma subsampling, and 4:4:4 chroma subsampling (i.e., no chroma subsampling). AV1 may code video data in a YUV color space where Y is a luma component, U is a first chroma component (e.g., blue projection), and V is a second chroma component (e.g., red projection).

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

The difference between the currently encoded samples and predicted values generated from the reference samples is called a residual. Video encoder 200 may encode the residual values (e.g., through transformation, quantization, and entropy coding) in an encoded video bitstream. Video decoder 300 may decode the residual values, determine predicted values generated from the reference samples in the same manner as video encoder 200, and add the predicted values generated from reference samples to the residuals to reconstruct the coding block The intra prediction modes of AV1 include directional intra prediction, non-directional smooth intra prediction, recursive filter intra prediction, chroma from luma (CFL) prediction, intra block copy, and color palette modes. Video encoder 200 may encode syntax elements that indicate the intra prediction mode used to video decoder 300.

Video encoder 200 may generally form a prediction block for the coding block using one of the aforementioned inter prediction modes or intra prediction modes (e.g., excluding color palette mode). In general, video encoder 200 subtracts the value of the sample of the coding block from a prediction sample determined according to one of the intra prediction modes or inter prediction modes to determine a residual block. Video decoder 300 performs the inverse of this operation. Video decoder 300 determines the prediction samples in the same manner as video encoder 200, but adds the decoded residual to the prediction sample to reconstruct the coding block.

To encode a block using directional intra prediction, video encoder 200 may determine particular directional intra prediction mode to determine the prediction samples. AV1 provides fifty-six directional intra prediction modes. When encoding a coding block using directional intra prediction, video encoder 200 uses a directional predictor that projects each sample of the coding block to a prediction sample location. The prediction sample location may be a sub-pixel location (e.g., between samples). In such a case, video encoder may use interpolation (e.g., a 2-tap bilinear filter) to determine the value of the prediction sample.

In non-directional smooth intra prediction, video encoder 200 may determine prediction samples according a DC prediction mode, a Paeth prediction mode, or by using one of three smooth predictors. In DC prediction mode, video encoder 200 predicts samples of a block from the average of available neighboring reference samples. In Paeth prediction mode, video encoder 200 uses one of a top reference sample, left reference sample, or top-left edge reference sample which has a value closest to (top+left−topleft). Video encoder 200 may determine the three smooth predictors using quadratic interpolation in a horizontal direction, a vertical direction, or the average of the interpolations in the horizontal and vertical directions.

Video encoder 200 may determine to use recursive filter intra prediction in situations where there is reduced spatial correlation between samples of the coding blocks and prediction samples at the edges of coding blocks. To perform recursive intra prediction, video encoder 200 may determine one of five filter intra modes. Each of the five intra modes are defined by a set of 7-tap filters that specify a correlation between samples in a 4×2 sub-block and seven adjacent neighboring samples. Video encoder 200 may determine one of five types of intra filter modes at the block level and predict samples in 4×2 sub-blocks.

Video encoder 200 may determine to use chroma from luma (CFL) to predict chroma samples from corresponding reconstructed luma samples. In particular, video encoder 200 may use sums of reconstructed luma samples in 2×2 sub-blocks of a luma block minus the average luma sample value of the block, as well as DC prediction samples for the chroma block, to determine a final prediction sample for predicting the chroma samples. The sums of reconstructed luma samples in 2×2 sub-blocks of a luma block minus the average luma sample value of the block represent an "AC" contribution from the luma block.

In intra block copy mode, video encoder 200 and video decoder 300 may predict a coding block using a previously-reconstructed coding block as a reference block, where the reference block is in the same frame as the currently coded coding block. Video encoder 200 may indicate a location of the previously-reconstructed coding block using a displacement vector (e.g., an x and y displacement from the currently coded coding block). Intra block copy mode is similar to a translational inter prediction mode, but rather than using a reference block in another frame, the intra block copy mode uses a reference block from the same frame. Intra block copy mode may be particularly useful for so-called "screen content" video frames that may include text, characters, and/or repeated textures (e.g., such as video displaying the contents of a computer screen).

In each of the aforementioned intra prediction modes, video encoder 200 may generate a residual block by subtracting the sample values of a currently coded block from prediction pixels generated in accordance with one of the intra prediction modes. Color palette mode (also referred to as palette mode coding or simply palette mode) is considered another type of intra prediction mode, as color palette mode does not use predicted samples generated from reference samples values. Color palette mode may be useful for frames of video data with a limited number of unique colors (e.g., screen content).

In color palette mode, video encoder 200 and video decoder 300 may generate a palette predictor block (e.g., prediction block) based on a color palette and the sample/pixel value of each sample or pixel in the coding block. For example, the color palette may be a list of palette colors. For each location in the palette predictor block, video encoder 200 may assign a palette color from the list palette colors (e.g., assign a palette color that is closest to the corresponding sample value in the coding block). For instance, each prediction sample in the palette predictor block corresponds to a sample in the coding block. Video encoder 200 may determine palette color from the list of palette colors that is closest to a sample in the coding block, and assign the determined palette color to the prediction sample in the palette predictor block.

Video encoder 200 may determine residual values between the palette predictor block and the coding block, and encode and signal information indicative of the residual values. Video encoder 200 may also encode and signal the list of palette colors.

In some examples, in addition to the residual values and the list of palette colors, video encoder 200 may construct a palette token block. The palette token block includes a plurality of palette token values, and each of the palette token values may be an index into the list of palette colors that identifies the palette color for a prediction sample in the palette predictor block. For example, if the palette predictor block is 16×16, then the palette token block may be 16×16. If the palette color for the first prediction sample in the predictor block is identified by index 2 in the list of palette colors, then video encoder 200 may assign the first palette token value in the palette token block with the value of 2 to indicate that the value for the first prediction sample in the predictor block is located at index 2 in the list of palette colors. Video encoder 200 may encode and signal the palette token block.

Video decoder 300 may receive the information for the palette token block, the list of palette colors, and the residual values. Video decoder 300 may reconstruct the palette token block based on the signaled information. Video decoder 300 may reconstruct the palette predictor block based on the palette token block and the list of palette colors. For example, video decoder 300 may determine that the value of the prediction sample in the first location of the palette predictor block is at index 2 in the list of palette colors. Video decoder 300 may access index 2 in the list of palette colors and assign the color value in the list of palette colors are index 2 as the value of the first prediction sample in the palette predictor block. Video decoder 300 may repeat such operations for reconstructing the palette predictor block. Video decoder 300 may add the palette predictor block with the residual values to reconstruct the current block.

When predicting blocks of a current frame of video data using an inter prediction mode, video encoder 200 and video decoder 300 may use video data from one or more reference frames of video data. Video encoder 200 may encode sample values based on the differences (e.g., the residuals) between sample values of a current block to be coded and prediction samples within a different frame (e.g., a reference frame). The reference frame may be before or after the currently coded frame in presentation order. Video encoder 200 may determine the prediction samples and reference frame based on the inter prediction mode.

Like for intra prediction modes, video encoder 200 may encode the residual values (e.g., through transformation, quantization, and entropy coding) in an encoded video bitstream. Video decoder 300 may decode the residual values, determine the prediction block in the same manner as video encoder 200, and add the prediction block to the residuals to reconstruct the coding block. Video encoder 200 may determine a particular inter prediction mode from among a plurality of inter prediction modes that provides the best rate-distortion cost. Video encoder 200 may encode the mode information, residual values (e.g., the difference between a current sample and a prediction sample), and other block characteristics in an encoded video bitstream. The inter prediction modes of AV1 include translational motion compensation, affine motion compensation (e.g., warped motion compensation), overlapped block motion compensation (OBMC), and compound inter-intra predictor modes.

For translational motion compensation, video encoder 200 may generate the prediction block (e.g., the block including the prediction samples) using one or more motion vectors. Video encoder 200 may generally perform a motion search to identify a reference block that closely matches the coding block, e.g., in terms of differences between the samples of the coding block and the prediction samples of the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current coding block using uni-directional prediction or bi-directional prediction.

Video encoder 200 may also encode the motion vector(s) using a prediction method. For example, video encoder 200 may encode motion vectors with reference to other candidate motion vectors, including spatial motion vectors (e.g., motion vectors of neighboring blocks encoded using inter prediction) or temporal motion vectors (e.g., motion vectors from co-located blocks in other pictures coded using inter prediction). The candidate motion vectors may be added to a dynamic motion vector reference list.

AV1 also provide an affine motion compensation mode. In affine motion compensation mode, video encoder 200 may determine the warping parameters to warp the reference block to get the prediction using neighboring candidates' motion vectors. The warping parameters represent non-translational or affine motion, such as zoom in or out, rotation, perspective motion, or other irregular motion types.

Video encoder 200 may use OBMC mode to decrease prediction errors near block edges. In OBMC mode, video encoder 200 and video decoder 300 determines prediction samples using prediction samples generated based on motion vectors from the top neighboring block and/or the left neighboring block. Video encoder 200 and video decoder 300 may generate the final prediction samples by combining such prediction samples using smoothing filters.

In compound inter-intra predictor mode, video encoder 200 and video decoder 300 may form a prediction sample using both inter prediction and intra prediction techniques. Two prediction samples may be combined using weighting coefficients.

When performing a prediction process, such as intra prediction or inter prediction of a block, video encoder 200 may calculate residual data for the block. The residual data, such as a residual block, represents sample by sample differences between the block and prediction samples for the block, formed using the corresponding prediction mode. Video encoder 200 may apply one or more transforms to the residual block, to produce transformed data in a transform domain instead of the sample domain. For example, video encoder 200 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may entropy encode syntax elements, including syntax element indicating the value of quantized transform coefficients. As another example, video encoder 200 may entropy encode prediction syntax elements (e.g., motion information for inter prediction or intra mode information for intra prediction). In accordance with AV1, video encoder 200 may be configured to perform entropy encoding using a symbol-to-symbol adaptive multi-symbol arithmetic coder. A syntax element in AV1 includes an alphabet of N elements, and a context (e.g., probability model) includes a set of N probabilities. Video encoder 200 may store the probabilities as 15 bit cumulative distribution functions (CDFs). Video encoder 200 may perform recursive scaling, with an update factor based on the alphabet size, to update the contexts.

In this manner, video encoder 200 may generate a bitstream including encoded video data, e.g., syntax elements describing partitioning of a picture into blocks (e.g., superblocks and coding blocks) and prediction modes and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using entropy decoding in a manner substantially similar to, albeit reciprocal to, the entropy encoding process of video encoder 200. The syntax elements may define partitioning information for partitioning of a picture into superblocks and coding blocks. The syntax elements may further define prediction and residual information for blocks (e.g., coding blocks) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (e.g., an intra or inter prediction mode) and related prediction information (e.g., motion information for inter prediction) to form a prediction samples for the block. Video decoder 300 may then combine the prediction samples and the corresponding sample values of the residual block (on a sample-by-sample basis) to reproduce the original block. Video decoder 300 may perform additional processing, such as performing a loop filtering process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In HEVC, the largest coding unit in a slice is called a coding tree block (CTB) or coding tree unit (CTU). A CTB contains a quad-tree the nodes of which are coding units. The size of a CTB can range from 16×16 to 64×64 in the HEVC main profile (although technically 8×8 CTB sizes can be supported). A coding unit (CU) could be the same size of a CTB to as small as 8×8. Each coding unit is coded with one mode, i.e., inter or intra. When a CU is inter-coded, it may be further partitioned into 2 or 4 prediction units (PUs) or become just one PU when further partition doesn't apply. When two PUs are present in one CU, they can be half size rectangles or two rectangles with ¼ or ¾ size of the CU. When the CU is inter-coded, each PU has one set of motion information, which is derived with a unique inter prediction mode.

In HEVC, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode, for each potential prediction direction from either list 0 or list 1, a reference index is explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

Figure 2B:
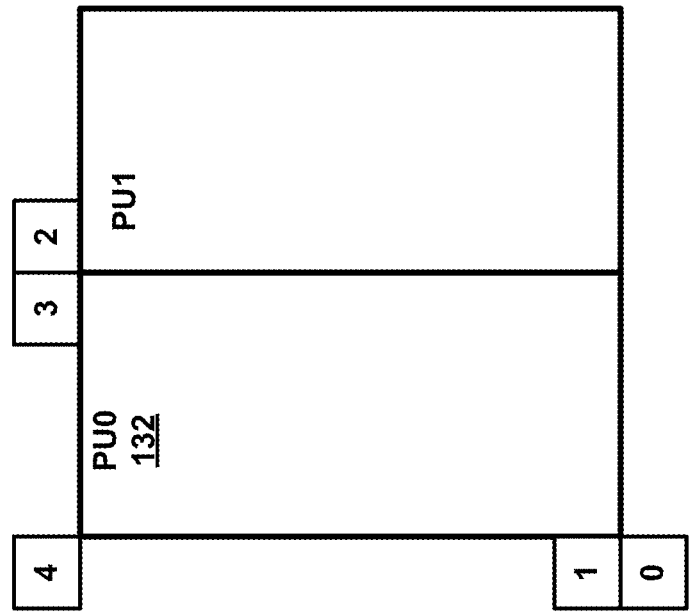
FIG. 2A and FIG. 2B are conceptual diagrams illustrating example spatial neighboring motion vector candidates for merge mode and Advanced Motion Vector Prediction (AMVP) modes.
Figure 2A:
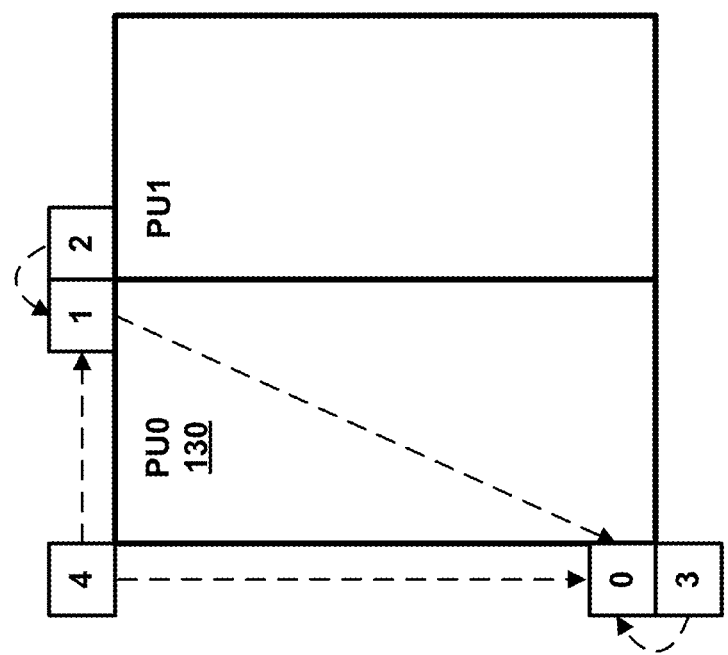

FIG. 2A and FIG. 2B are conceptual diagrams illustrating example spatial neighboring motion vector candidates for merge mode and Advanced Motion Vector Prediction (AMVP) modes. Spatial MV candidates are derived for PU0 130 from the neighboring blocks as shown in FIG. 2A, although the methods generating the candidates from the blocks differ for merge and AMVP modes. In merge mode, up to four spatial MV candidates can be derived with the orders shown in FIG. 2A with numbers, and the order is the following: left (0, A1), above (1, B1), above right (2, B0), below left (3, A0), and above left (4, B2), as shown in FIG. 2A.

In AMVP mode, as shown in FIG. 2B for PU0 132, the neighboring blocks are divided into two groups: a left group including blocks 0 and 1, and an above group including blocks 2, 3, and 4. For each group, the potential candidate in a neighboring block referring to the same reference picture as that indicated by the signaled reference index has the highest priority to be chosen to form a final candidate of the group. It is possible that none of the neighboring blocks contain a motion vector pointing to the same reference picture. Therefore, if such a candidate cannot be found, video encoder 200 or video decoder 300 may scale the first available candidate to form the final candidate, thus the temporal distance differences can be compensated.

If enabled and available, video encoder 200 or video decoder 300 may add a temporal motion vector predictor (TMVP) candidate into the MV candidate list after spatial motion vector candidates. The process of motion vector derivation for TMVP candidate is the same for both merge and AMVP modes. However, the target reference index for the TMVP candidate in the merge mode is always set to 0.

Figure 3B:
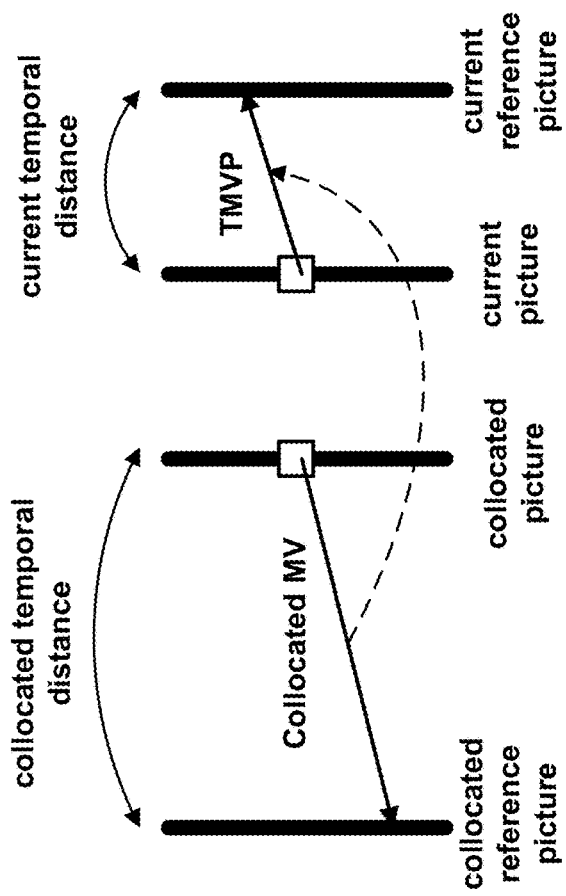
FIG. 3B is a conceptual diagram illustrating an example of motion vector (MV) scaling.
Figure 3A:
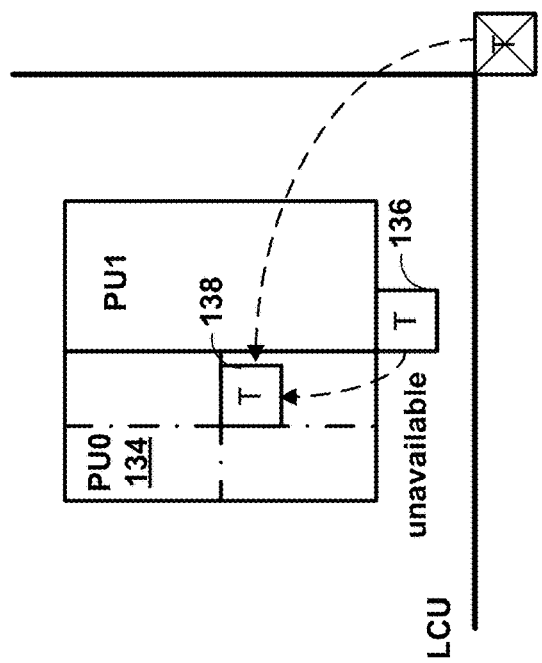
FIG. 3A is a conceptual diagram illustrating an example temporal motion vector prediction candidate.

FIG. 3A is a conceptual diagram illustrating an example temporal motion vector prediction candidate. For PU0 134, the primary block location for TMVP candidate derivation is the bottom right block outside of the collocated PU, as shown in FIG. 3A as a block "T" 136, to compensate the bias to the above and left blocks used to generate spatial neighboring candidates. However, if that block is located outside of the current CTB row or motion information is not available, block T 136 is substituted with a center block T 138 of PU0 134.

Motion vector for TMVP candidate is derived from the co-located PU of the co-located picture, indicated in the slice level. The motion vector for the co-located PU is called a collocated MV. Similar to temporal direct mode in AVC, to derive the TMVP candidate motion vector, video encoder 200 or video decoder 300 may scale the co-located MV to compensate the temporal distance differences, as shown in FIG. 3A and FIG. 3B.

Several aspects of merge and AMVP modes are discussed below.

Motion vector scaling: It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. The motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a candidate list is not complete, video encoder 200 or video decoder 300 generates artificial motion vector candidates and inserts the artificial motion vector candidates at the end of the list until it will have all candidates. In merge mode, there are two types of artificial MV candidates: combined candidate derived only for B-slices and zero candidates used only for AMVP if the first type does not provide enough artificial candidates.

For each pair of candidates that are already in the candidate list and have necessary motion information, video encoder 200 or video decoder 300 may derive bi-directional combined motion vector candidates by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge/AMVP candidate list. A pruning process is applied to solve this problem. When performing the pruning process, video encoder 200 or video decoder 300 compares one candidate against the others in the current candidate list to avoid inserting identical candidate in certain extent. To reduce the complexity, only limited numbers of comparisons are applied in the pruning process instead of comparing each candidate with all the other existing candidates.

Merge Mode with Motion Vector Difference

Merge mode with motion vector difference (MMVD) is a merge mode that allows signaling additional motion vector difference explicitly to refine the motion field of merge mode. A MMVD flag is signaled right after sending a skip flag, merge flag and regular merge flag to indicate whether MMVD mode is used for a CU. In MMVD, after a merge candidate is selected, the merge candidate is further refined by the signaled MVD s information. The further information includes a merge candidate flag, an index to specify motion magnitude, and an index for indication of motion direction. In MMVD mode, one for the first 2 candidates in the merge list is selected to be used as a MV basis. The merge candidate flag is signaled to specify which one is used.

Figure 4:
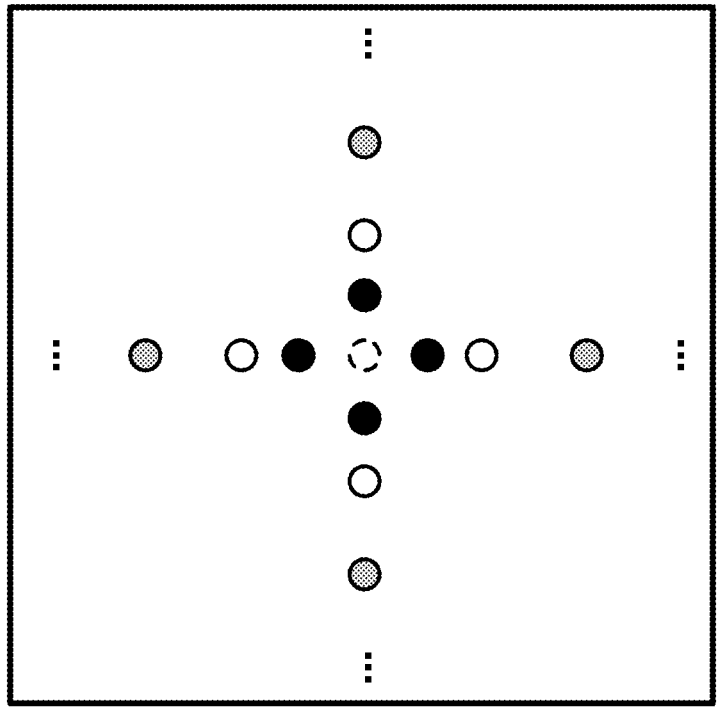
FIG. 4 is a conceptual diagram illustrating an example of merge mode with motion vector difference (MMVD) search points.
Figure 4:
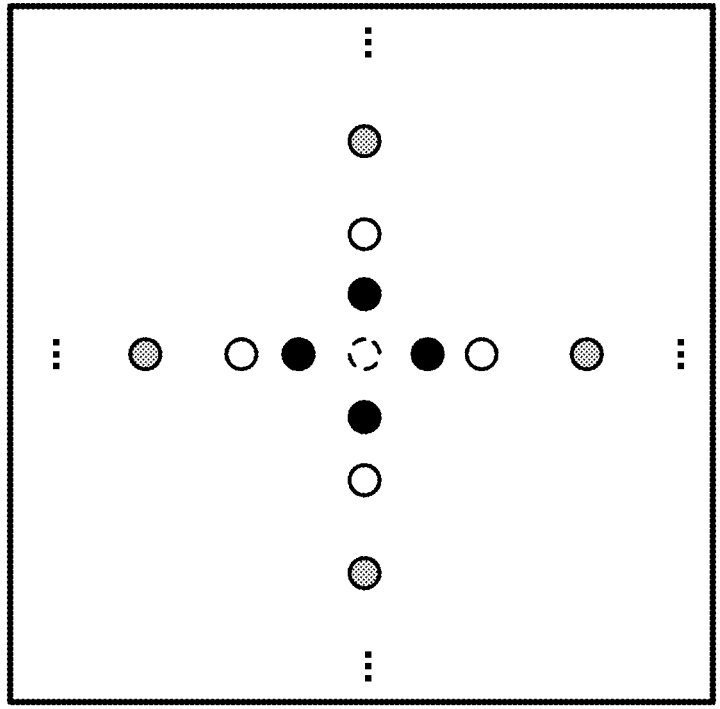

FIG. 4 is a conceptual diagram illustrating an example of merge mode with motion vector difference (MMVD) search points. A distance index specifies motion magnitude information and indicates a pre-defined offset (also known as a distance offset) from the starting point. That is, video encoder 200 and video decoder 300 may be configured with a set of pre-defined offsets, and video encoder 200 may encode an index into the set, where the index corresponds to one of the distance offset entries of the set. In this manner, video decoder 300 may decode the offset to determine which distance offset is to be applied. As shown in FIG. 4, a distance offset is added to either horizontal component or vertical component of the starting MV. FIG. 4 is a conceptual diagram illustrating an example of merge mode with MMVD search points. The relation of distance index and pre-defined distance offset is defined as $2^{idx-2}$, where idx is an integer ranging from 0 to 7. When a picture header syntax element (e.g., pic_fpel_mmvd_enabled_flag) is set enabled, index-to-offset mapping is changed to be $2^{idx}$.

The direction index represents the direction of the motion vector difference (MVD) relative to the starting point. The direction index can represent of the four directions, as shown in the below table, where 00, 01, 10 and 11 denote right, left, up and down, respectively. The meaning of MVD sign could be variant according to the information of starting MVs. When the starting MVs is a uni-prediction MV or bi-prediction MVs with both lists pointing to the same side of the current picture (i.e., POCs of two references are both larger than the POC of the current picture, or are both smaller than the POC of the current picture), the sign in the below table specifies the sign of MV offset added to the starting MV. When the starting MVs are bi-prediction MVs with the two MVs point to the different sides of the current picture (i.e. the POC of one reference is larger than the POC of the current picture, and the POC of the other reference is smaller than the POC of the current picture), the sign in the table below specifies the sign of the MV offset added to the list0 MV component of starting MV and the sign for the list1 MV has the opposite value.

| Direction IDX | 00 | 01 | 10 | 11 |
|---|---|---|---|---|
| x-axis | + | − | N/A | N/A |
| y-axis | N/A | N/A | + | − |

Figure 5:
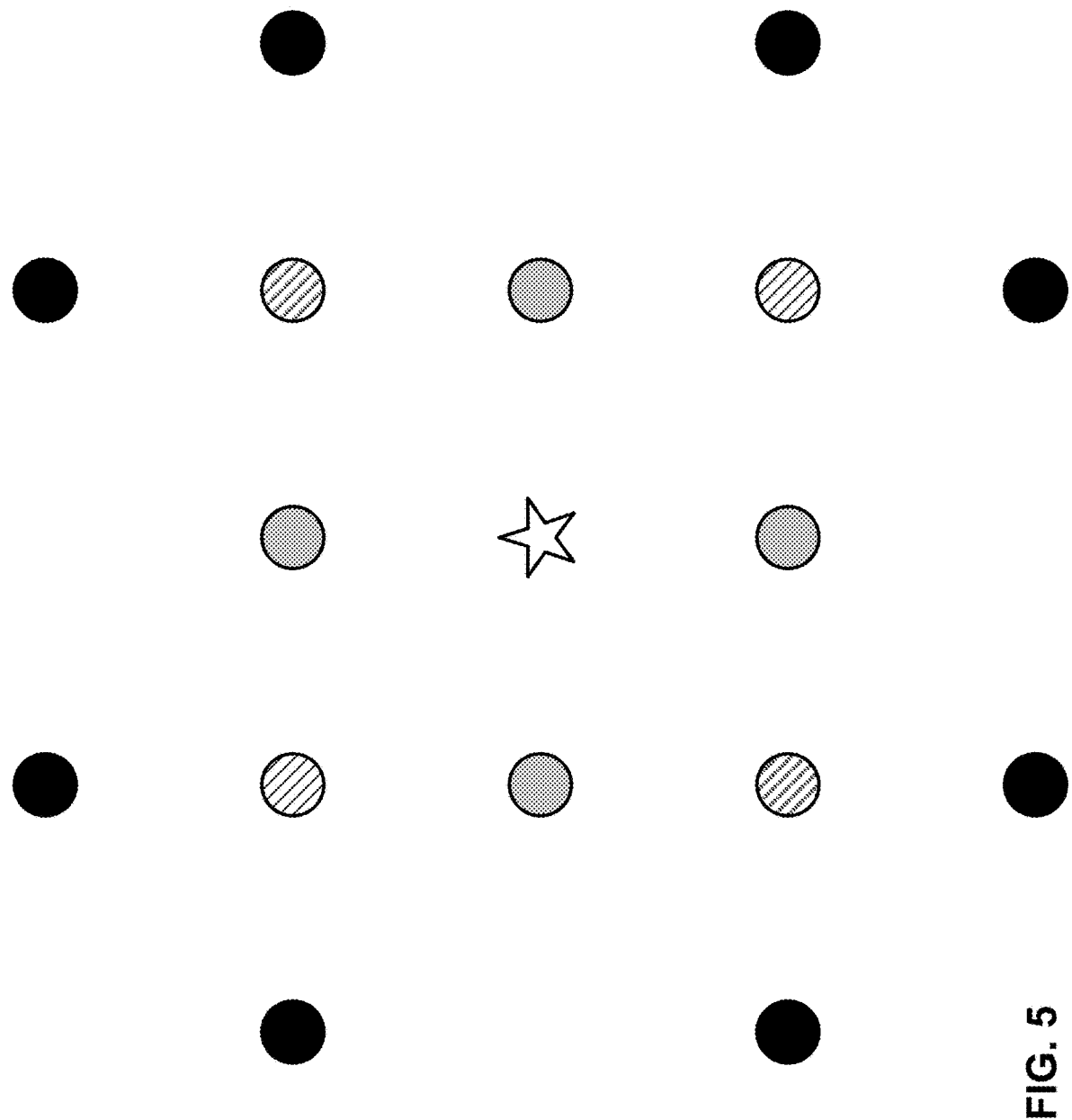
FIG. 5 is a conceptual diagram illustrating additional directions along k×π/8 diagonal angles.

FIG. 5 is a conceptual diagram illustrating additional directions along k×π/8 diagonal angles.

TM Based Reordering for MMVD and Affine MMVD

Distance offsets may be extended for MMVD and affine MMVD modes. Additional refinement positions along k×π/8 diagonal angles are added as shown in FIG. 5, thus increasing the number of directions from 4 to 16. FIG. 5 is a conceptual diagram illustrating additional directions along k×π/8 diagonal angles. In FIG. 5, gray positions are used in the anchor. Second, based on the SAD cost between the template (one row above and one column left to the current block) and its reference for each refinement position, all the possible MMVD refinement positions (16×6) for each base candidate are reordered. Finally, the top ⅛ refinement positions with the smallest template SAD costs are kept as available positions, consequently for MMVD index coding. The MMVD index is binarized by the rice code with the parameter equal to 2. The affine MMVD reordering is extended, in which additional refinement positions along k×π/4 diagonal angles are added. After reordering the top ½ refinement positions with the smallest template SAD costs are kept.

Figure 6:
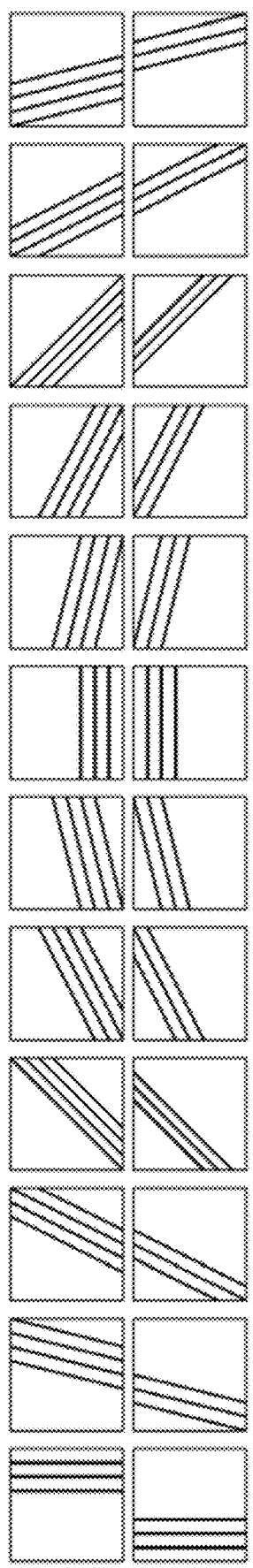
FIG. 6 is a conceptual diagram illustrating example geometric partitions.

FIG. 6 is a conceptual diagram illustrating example geometric partitions.

Introduction on Geometric Partitioning Mode (GPM)

In VVC, a geometric partitioning mode (GPM) is supported for inter prediction. The geometric partitioning mode is signaled using a CU-level flag as one kind of merge mode, with other merge modes including the regular merge mode, the MMVD mode, the combined inter-prediction merge and intra-picture prediction (CIIP) mode and the subblock merge mode. In total, 64 partitions are supported by geometric partitioning mode for each possible CU size w×h=$2^m$×$2^n$ with m, n∈{3 . . . 6} excluding 8×64 and 64×8. When GPM mode is used, a CU is split into two parts by a geometrically located straight line as shown in FIG. 6.

The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion for each partition is derived as follows.

Figure 7:
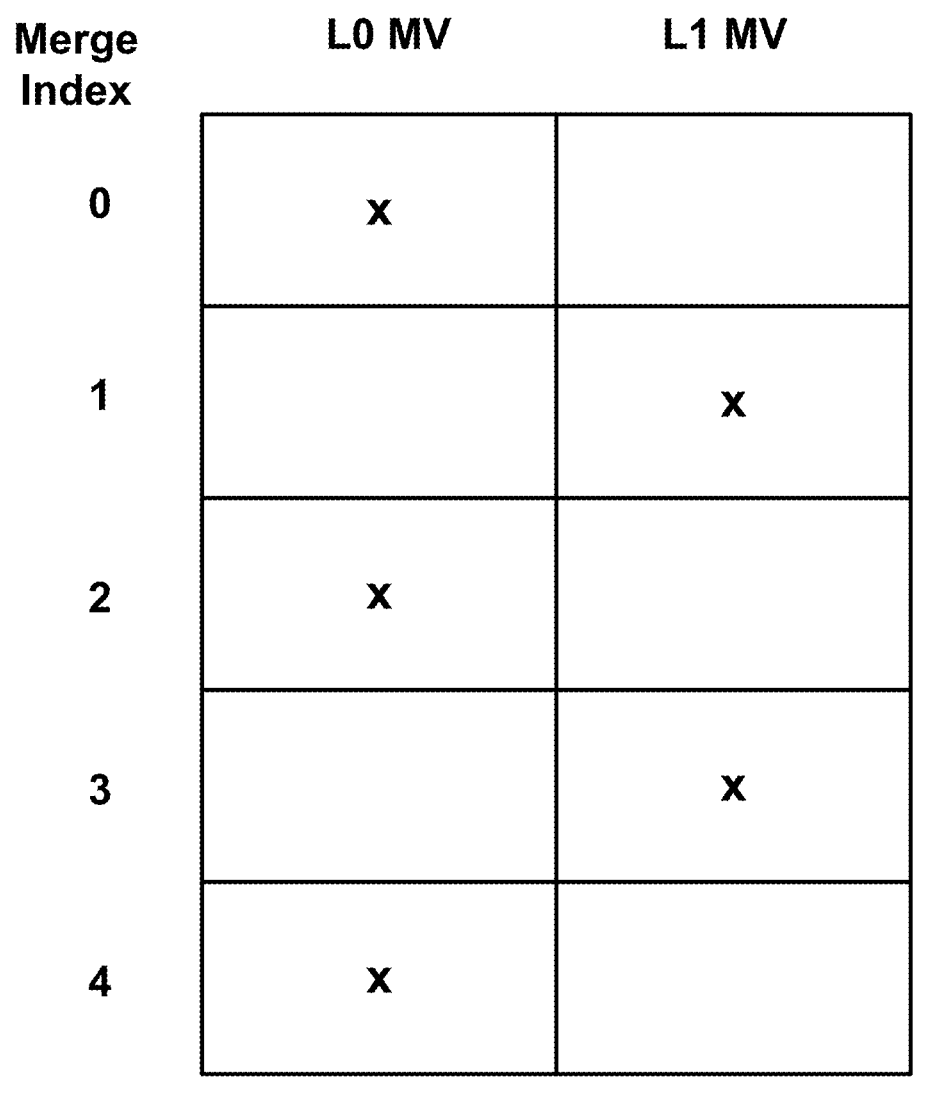

The uni-prediction candidate list is derived directly from the merge candidate list constructed as in merge mode. Denote n as the index of the uni-prediction motion in the geometric uni-prediction candidate list. The LX motion vector of the n-th merge candidate, with X equal to the parity (even or odd) of n, is used as the n-th uni-prediction motion vector for geometric partitioning mode. These motion vectors are marked with "x" in FIG. 7. In case a corresponding LX motion vector of the n-th extended merge candidate does not exist, the L(1−X) motion vector of the same candidate is used instead as the uni-prediction motion vector for geometric partitioning mode.

If geometric partitioning mode is used for the current CU, then a geometric partition index indicating the partition mode of the geometric partition (angle and offset), and two merge indices (one for each partition) are further signaled. The number of maximum GPM candidate size is signaled explicitly in an SPS and specifies syntax binarization for GPM merge indices. After predicting each of part of the geometric partition, the sample values along the geometric partition edge are adjusted using a blending processing with adaptive weights.

Geometric Partitioning Mode (GPM) with Merge Motion Vector Differences

Geometric partitioning mode (GPM) in VVC is extended by applying motion vector refinement to the existing GPM uni-directional MVs. A flag is first signaled for a GPM CU to specify whether this GPM is used. If GPM is used, video encoder 200 may determine, for each geometric partition of a GPM CU, whether or not to signal an MVD. If an MVD is signaled for a geometric partition, after a GPM merge candidate is selected, video encoder 200 and video decoder 300 may further refine the motion of the geometric partition by the signaled MVDs information. All other procedures may be kept the same as in GPM.

Video encoder 200 may signal the MVD as a pair of distance and direction elements, similar as in MMVD. There are nine candidate distance offsets (¼-pel, ½-pel, 1-pel, 2-pel, 3-pel, 4-pel, 6-pel, 8-pel, 16-pel), and eight candidate directions (four horizontal/vertical directions and four diagonal directions) involved in GPM with MMVD (GPM-MMVD). In addition, when pic_fpel_mmvd_enabled_flag is equal to 1, the MVD is left shifted by 2 as in MMVD.

The MMVD designs as in VVC and ECM is much restricted to updating based motion candidate by adding one of MV offsets in a predefined list (which contains only power-of-2 values). This kind of syntax shortcut, although useful for some cases, generally loses the flexibility in representing object movement with complex motion. Thus, this disclosure aims at making MMVD design more flexible and allows MVD representation to be more dynamically to cover all variety of motion vector varieties in a picture.

If not otherwise stated, the "base candidate motion" referred to hereafter represents the motion information that is derived from the motion information of a merge candidate, the uni-prediction motion information that is referenced from a GPM candidate list, or the bi-prediction motion information that is a pairwise combination from two candidates of the GPM merge candidate list.

Asymmetric MVD

In some examples, video encoder 200 may encode two distance offsets and two direction indices in the bitstream. Similarly, video decoder 300 may decode the two distance offsets and two direction indices from the bitstream. The distance offsets and direction indices may indicate delta vectors that are used to update the selected "base candidate motion" when the "base candidate motion" is of bi-prediction. A distance offset together with a direction index represents a certain MVD that could be used to update one of the bi-prediction motion vectors. Because two pairs of distance offset and direction index are signaled, two MVDs can be derived and used to update the respective motion vector (e.g., referring to reference pictures in Reference Picture List 0 or 1) of a bi-prediction "base candidate motion." Since the two MVDs need not be the same or symmetric, this first example implementation actually allows the two MVDs of bi-prediction "base candidate motion" to be asymmetric to each other. Thus, this could benefit decoder design, since no projection or mirroring is needed to map MVD from one reference picture to another. High-level syntax (in sequence parameter set, tile/slice header, picture header or subpicture header for examples) may be applied to control whether such mode is enabled or not.

In some examples, in addition or in the alternative to the example above, the number of direction indices to signal can be reduced to 1. That is, video encoder 200 may encode and video decoder 300 may decode two distance offsets but only a single direction index. The corresponding MVD components' sign values of the single direction index can be projected from one reference picture on Reference Picture List 0 to the other one on Reference Picture List 1. Specifically, when both reference pictures of the bi-prediction base candidate motion are both from the past or both from the future, the MVD components' sign values may be the same ones as indicated by the single direction index. Otherwise, i.e., if one reference picture is from reference picture list 0 and the other is from reference picture list 1, the MVD components' sign values of L1 MVD is symmetric to that of L0 MVD, which means they have opposite MVD sign values on each MVD component (i.e., when the sign is negative at L0 MVDx component, then the sign must be non-negative at L1 MVDx component).

In some examples, in addition to or in the alternative to the examples above, the MVD offsets and direction index (when it is existing in the first example implementation) correspond to Reference Picture List 1 are not signaled, and thus, the MVD corresponding to Reference Picture List 1 is always set equal to zero vector. That is, while video encoder 200 and video decoder 300 may code only a single set of MVD data, the MVD data only applies to one motion vector and not the other of a bi-predicted block.

In some examples, a syntax element, such as ph_mvd_l1_zero_flag, may have a value indicating whether MVD offsets and direction index are signaled in the bitstream. For example, video encoder 200 may determine whether two sets of MVD offset values will be signaled, and if so, signal a value for the syntax element indicating that two sets of MVD offset values will be signaled for a current block. Thus, video decoder 300 may determine whether only a single set of MVD values or whether two sets of MVD values will be signaled from the value of the syntax element. In one example, two sets of MVD values are signaled when ph_mvd_l1_zero_flag has a value of "true" e.g., 1. The syntax element, e.g., ph_mvd_l1_zero_flag, may be a high-level syntax used in an applicable video coding standard, such as VVC, to indicate whether L1 MVD exists in bitstream and may be named differently across different video coding standards, although the identical functionality may be provided.

For instance, in VVC, the ph_mvd_l1_zero_flag is a syntax element that specifies the mvd_coding(x0, y0, 1, cpIdx) syntax structure is not parsed and MvdL1[x0][y0][compIdx] and MvdCpL1[x0][y0][cpIdx][compIdx] are set equal to 0 for compIdx=0 . . . 1 and cpIdx=0 . . . 2. ph_mvd_l1_zero_flag equal to 0 specifies that the mvd_coding(x0, y0, 1, cpIdx) syntax structure is parsed. When not present, the value of ph_mvd_l1_zero_flag is inferred to be 1. The mvd_coding syntax structure contains syntax elements related to motion vector differences.

In some examples, in addition to or the alternative to the various examples above, MVDs of "base candidate motion" can be signaled in the same way as AMVP mode. That is, video encoder 200 may encode and video decoder 300 may decode MVD values indicating the magnitudes of each MVD component for both motion vectors (e.g., x- and y-components). The syntax structure of AMVP mode to signal MVDs can be reused completely in such techniques. Under this example, the sign value of each MVD component of L1 motion need not be signal, but instead may be derived in the same ways as the second example implementation does.

In some examples, the MMVD-related methods can be completely removed, since the disclosed techniques may provide a more flexible way to signal and represent MVD in bitstream for "base candidate motion."

Modified Merge List Construction Process

In some examples, video encoder 200 and video decoder 300 may code a CU-level flag to indicate the use of the techniques discussed above. Because it is unknown whether the "base candidate motion" is of bi-prediction or not (e.g., when it is inferred from the motion information of a merge candidate), this CU-level flag may be coded to force the merge candidate list construction process to drop all uni-prediction candidates and keep only bi-prediction candidates.

In another example, instead of sending a CU-level flag across encoders and decoders, some entries in the merge candidate list can be reserved only for bi-prediction motion candidates. Thus, when a merge index points to one of these reserved entries, video encoder 200 or video decoder 300 may use the techniques discussed above. For example, when the merge candidate list size is N (where N is a non-negative integer) and the first M entries (where M is non-negative and could be smaller or equal to N) of the merge candidate list are reserved only for bi-prediction motion candidates, video encoder 200 or video decoder 300 may fill bi-prediction candidates into vacant entries of merge candidate list starting from the zero-th entry while uni-prediction candidates are filled into vacant entries of merge candidate list starting from the M-th entry. In another example, when the merge candidate list size is the same N, but this time the last M entries in the merge candidates list are reserved only for bi-prediction motion candidates, video encoder 200 or video decoder 300 may fill the first N-M candidate entries in the merge candidate list in the same way as the original merge candidate list construction process does (e.g., HEVC, VVC, ECM) while the last M entries only accept bi-prediction motion candidates and drop uni-prediction ones.

In another example, the aforementioned change to merge candidate list construction can be skipped when ph_mvd_l1_zero_flag=true.

Base Candidate Motion

Video encoder 200 or video decoder 300 may infer the "base candidate motion" from the GPM candidate list through the 2 merge candidate indices pointing to two entries in the GPM candidate list.

Alternatively, video encoder 200 or video decoder 300 may infer the "base candidate motion" from the motion information of the merge candidate list.

Uni-Directional MMVD

In some examples, video encoder 200 may signal a syntax element to indicate whether uni-directional MMVD mode is used. Wherein the "base candidate motion" is uni-directional prediction, and one MVD (in terms of either magnitude plus sign or direction index plus distance offset index) is also signaled. High-level syntax (in sequence parameter set, tile/slice header, picture header or subpicture header for examples) may be applied to control whether such mode is enabled or not.

In another method, this syntax element can also indicate that the GPM merge candidate list (which contains only uni-prediction motion candidates) is used. Alternatively, in yet another example, this syntax element can also indicate that the merge candidate list construction process only accepts filling uni-prediction motion candidates, while bi-prediction ones are all dropped.

The uni-directional MMVD and asymmetric MMVD may be adaptively chosen at block level, and some syntax is used to differentiate between these two modes. For example, inter prediction direction is signaled to indicate whether the inter prediction direction is uni-directional or bi-directional. If the syntax element indicates uni-directional, then uni-directional MMVD is applied; otherwise (i.e., bi-directional) asymmetric MMVD is applied.

Figure 8:
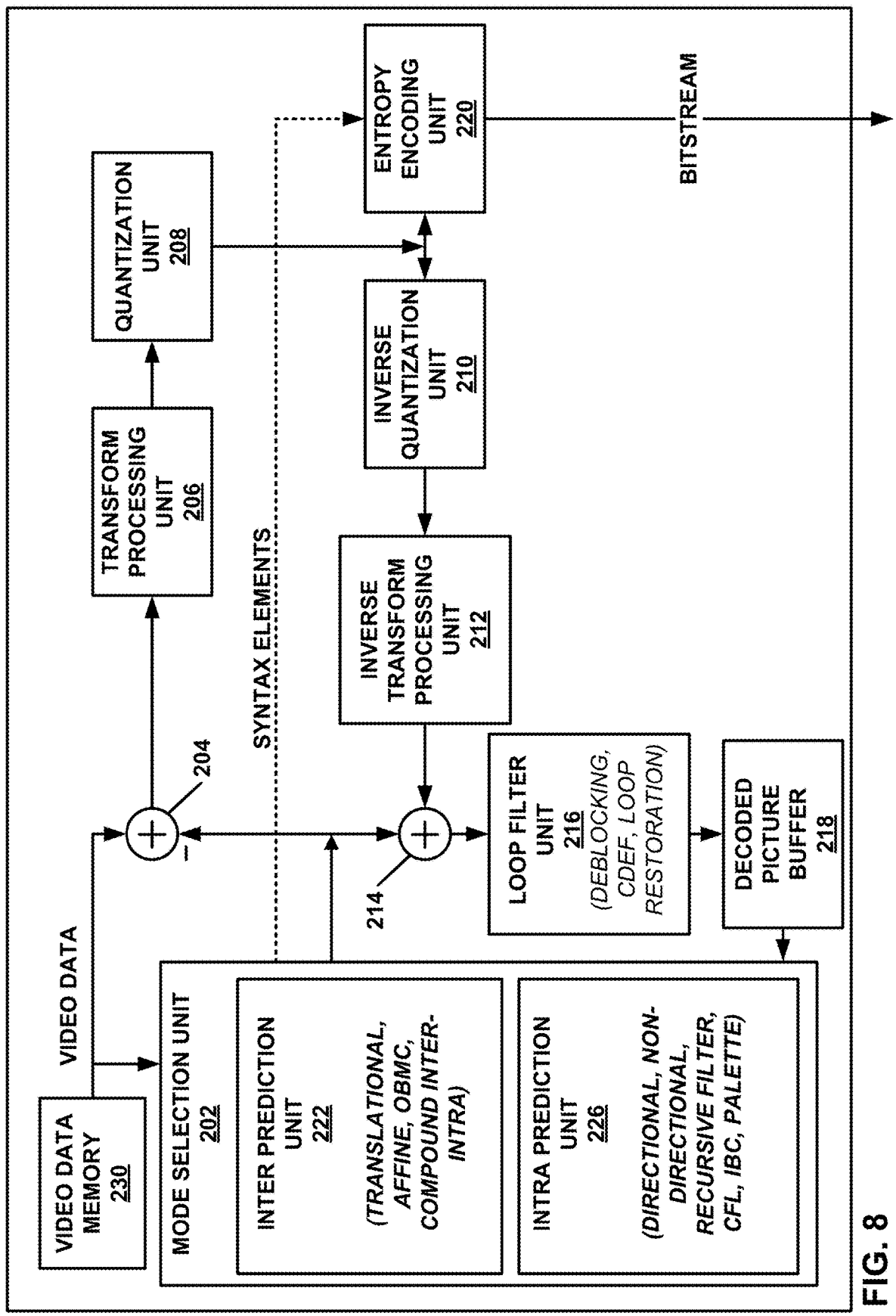
FIG. 8 is a block diagram illustrating an example video encoder that may perform the techniques of this disclosure.

FIG. 8 is a block diagram illustrating an example video encoder 200 that may perform the techniques of this disclosure. FIG. 8 is provided for purposes of explanation and should not be considered limiting of the techniques as broadly exemplified and described in this disclosure. For purposes of explanation, this disclosure describes video encoder 200 according to the techniques of the AV 1 coding format. However, the techniques of this disclosure may be performed by video encoding devices that are configured to encode video data according to other video coding formats and/or various video coding standards.

In the example of FIG. 8, video encoder 200 includes video data memory 230, mode selection unit 202, residual generation unit 204, transform processing unit 206, quantization unit 208, inverse quantization unit 210, inverse transform processing unit 212, reconstruction unit 214, loop filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, loop filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200. For example, as will be explained below, video data memory 230 may include a first buffer and a second buffer for storing the sums and averages of reconstructed luma sample values for CFL prediction.

The various units of FIG. 8 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture/frame of the video data from video data memory 230 and provide the video data to residual generation unit 204 and mode selection unit 202. Video data in video data memory 230 may be raw video data that is to be encoded.

Mode selection unit 202 includes inter prediction unit 222 and intra prediction unit 226. Inter prediction unit 222 may be configured to encode coding blocks of video data (e.g., both luma and chroma coding blocks) using translational motion compensation, affine motion compensation, OBMC, and/or compound inter-intra prediction, as described above. Intra prediction unit 226 may be configured to encode coding blocks of video data (e.g., both luma and chroma coding blocks) using directional intra prediction, non-directional intra prediction, recursive filter intra prediction, CFL, intra block copy (IBC), and/or color palette mode, as described above. Mode selection unit 202 may include additional functional units to perform video prediction in accordance with other prediction modes.

Mode selection unit 202 generally coordinates multiple encoding passes to test combinations of encoding parameters and resulting rate-distortion values for such combinations. The encoding parameters may include partitioning of superblocks into coding blocks, prediction modes for the coding blocks, transform types for residual data of the coding blocks, quantization parameters for residual data of the coding blocks, and so on. Mode selection unit 202 may ultimately select the combination of encoding parameters having rate-distortion values that are better than the other tested combinations.

Video encoder 200 may partition a picture retrieved from video data memory 230 into a series of coding blocks, and encapsulate one or more superblocks within tile. Mode selection unit 202 may partition superblocks of the picture in accordance with a tree structure.

In general, mode selection unit 202 also controls the components thereof (e.g., inter prediction unit 222 and intra prediction unit 226) to generate prediction samples for a current coding block. For example, for translational inter prediction of a current block, inter prediction unit 222 may perform a motion search to identify one or more closely matching reference blocks in one or more reference pictures (e.g., one or more previously coded pictures stored in DPB 218).

In particular, inter prediction unit 222 may calculate a value representative of how similar a potential reference block is to the current block, e.g., according to sum of absolute difference (SAD), sum of squared differences (SSD), mean absolute difference (MAD), mean squared differences (MSD), or the like. Inter prediction unit 222 may generally perform these calculations using sample-by-sample differences between the current block and the reference block being considered. Inter prediction unit 222 may identify a reference block having a lowest value resulting from these calculations, indicating a reference block that most closely matches the current block.

For translational inter prediction, inter prediction unit 222 may form one or more motion vectors (MVs) that defines the positions of the reference blocks in the reference pictures relative to the position of the current block in a current picture. For example, for uni-directional inter prediction, inter prediction unit 222 may determine a single motion vector, whereas for bi-directional inter prediction, inter prediction unit 222 may determine two motion vectors.

When a current block (e.g., a CU) is predicted using bi-directional inter prediction, inter prediction unit 222 may also encode motion information representing two motion vectors used to predict the current block. For example, inter prediction unit 222 may construct a merge candidate list including motion information of neighboring blocks to the current block. Inter prediction unit 222 may, in some examples, limit the merge candidate list to only include candidates that are bi-predicted. Inter prediction unit 222 may encode a merge candidate index indicating a candidate including motion vectors to be used as motion vector predictors (also referred to herein as "predictor motion vectors.")

Furthermore, inter prediction unit 222 may calculate motion vector difference (MVD) values for each of the motion vectors used to predict the current block. In some examples, the MVD values may include respective offset values (e.g., offset indexes) representing magnitudes of the offsets. In some examples, the MVD values may include respective direction indexes representing directions for the MVDs. In some examples, the MVD values may include only a single direction index representing directions for the MVDs. If a single direction index is included, in some examples, if the two motion vectors refer to reference pictures in the same reference picture list, the direction may be the same for the two MVDs, whereas if the two motion vectors refer to reference pictures in different reference picture lists, the directions may be opposite between the two motion vectors (e.g., up for the first motion vector and down for the second motion vector). Alternatively, the MVDs may include respective x- and y-components.

Entropy encoding unit 220 may encode merge information for the current block, where the merge information may include a merge index and the MVD values. Thus, when encoding motion information for a bi-directionally inter predicted block using merge with motion vector difference (MMVD) mode, entropy encoding unit 220 may encode a merge index and respective MVD values, but need not encode reference picture list and reference picture index values for the motion information.

Inter prediction unit 222 may then generate a prediction block of prediction samples using the motion vectors. For example, inter prediction unit 222 may retrieve data of the reference block using the motion vector. As another example, if the motion vector has fractional sample precision, inter prediction unit 222 may interpolate values for the prediction block according to one or more interpolation filters. Moreover, for bi-directional inter prediction, inter prediction unit 222 may retrieve data for two reference blocks identified by respective motion vectors and combine the retrieved data, e.g., through sample-by-sample averaging or weighted averaging. In some examples, inter prediction unit 222 may perform the techniques for MMVD merge mode with asymmetric motion vector differences and other techniques described in this disclosure.

As another example, for intra prediction, intra prediction unit 226 may generate the prediction samples from samples in the same picture as the current block. In some examples, intra prediction unit 226 may generate prediction samples from reference samples that neighbor the current block. For example, for directional intra prediction modes, intra prediction unit 226 may generally mathematically combine values of neighboring samples and use these calculated values in the defined direction across the current block as the prediction block. As another example, for the non-directional DC mode, intra prediction unit 226 may calculate an average of the neighboring samples to the current block to generate the prediction samples.

For other video coding techniques such as an intra block copy mode, affine motion compensation, recursive filter intra prediction, and other prediction modes, as some examples, inter prediction unit 222 or intra prediction unit 226 generates prediction samples in accordance with the techniques of the particular coding mode being used. In some examples, such as color palette mode coding, intra prediction unit 226 may generate prediction samples of a prediction block (e.g., palette predictor block) but the prediction samples may not be based on reference samples. Rather, the prediction samples may be based on a list of palette colors, where each prediction sample of the palette predictor block is one of the color values of the list of palette colors. Intra prediction unit 226 may generate the palette predictor block based on the list of palette colors and determine residual values between the palette predictor block and the coding block.

Mode selection unit 202 provides the prediction samples to residual generation unit 204. Residual generation unit 204 receives a raw, unencoded version of the current block from video data memory 230 and the prediction samples from mode selection unit 202. Residual generation unit 204 calculates sample-by-sample differences between the current block and the prediction samples. The resulting sample-by-sample differences define a residual block for the current block. In some examples, residual generation unit 204 may be formed using one or more subtractor circuits that perform binary subtraction.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current coding block. Video encoder 200 (e.g., via mode selection unit 202) may adjust the degree of quantization applied to the transform coefficient blocks associated with the current block by adjusting the QP value associated with the coding block. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current coding block (albeit potentially with some degree of distortion) based on the reconstructed residual block and the prediction samples generated by mode selection unit 202. For example, reconstruction unit 214 may add samples of the reconstructed residual block to corresponding prediction samples generated by mode selection unit 202 to produce the reconstructed block.

Loop filter unit 216 may perform one or more filter operations on reconstructed blocks. For example, loop filter unit 216 may perform deblocking operations to reduce blockiness artifacts along edges of CUs. In other examples, loop filter unit 216 may apply a constrained directional enhancement filter (CDEF), which may be applied after deblocking, and may include the application of non-separable non-linear low-pass directional filters based on estimated edge directions. Loop filter unit 216 may also include a loop restoration filter, which is applied after CDEF, and may include a separable symmetric normalized Wiener filter or a dual self-guided filter. Operations of loop filter unit 216 may be skipped, in some examples.

Video encoder 200 stores reconstructed blocks in DPB 218. For instance, in examples where operations of loop filter unit 216 are not performed, reconstruction unit 214 may store reconstructed blocks to DPB 218. In examples where operations of loop filter unit 216 are performed, loop filter unit 216 may store the filtered reconstructed blocks to DPB 218. Inter prediction unit 222 may retrieve a reference picture from DPB 218, formed from the reconstructed (and potentially filtered) blocks, to inter predict blocks of subsequently encoded pictures. In addition, intra prediction unit 226 may use reconstructed blocks in DPB 218 of a current picture to intra predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter prediction or intra mode information for intra prediction) from mode selection unit 202.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as 15 bit cumulative distribution functions (CDFs). Entropy encoding unit 22 may perform recursive scaling, with an update factor based on the alphabet size, to update the contexts.

Video encoder 200 may output an encoded video bitstream that includes the entropy encoded syntax elements needed to reconstruct blocks of a slice or picture. For example, entropy encoding unit 220 may output the bitstream.

Video encoder 200 represents an example of a device configured to encode video data including a memory configured to store video data, and one or more processing units implemented in circuitry and configured to determine a base motion vector predictor in a candidate list for a current block of the video data; determine a first distance offset and a first direction index based on a first motion vector and the base motion vector predictor; determine a second distance offset and a second direction index based on a second motion vector and the base motion vector predictor, wherein at least one of: the first distance offset and the second distance offset are asymmetrical or the first direction index and the second direction index are asymmetrical; use the first motion vector and the second motion vector to generate a prediction block; generate residual data based on the prediction block and the current block; and encoding the residual data.

In another example, video encoder 200 represents an example of a device configured to encode video data including a memory configured to store video data, and one or more processing units implemented in circuitry and configured to determine a base motion vector predictor in a candidate list for a current block of the video data, wherein the base motion vector predictor is a bi-prediction motion vector predictor; determine a first distance offset and a direction index based on a first motion vector difference (MVD), the first MVD indicating a difference from a first motion vector; determine, based on whether a first and second reference picture of the base motion vector predictor are both from the same reference picture list (or the first and second reference picture of the base motion vector predictor are both after the current picture in playback order (in the future) or both before the current picture in playback order (in the past)), whether a sign value of a second MVD is opposite a sign value for the first MVD, the second MVD indicating a difference from a second motion vector; determine a second distance offset based on the second MVD; signal the first distance offset, the second distance offset, and the direction index, wherein the first distance offset and the second distance offset are asymmetrical, and wherein the first distance offset; use the first motion vector and the second motion vector to generate a prediction block; generate residual data based on the prediction block and the current block; and encoding the residual data.

In another example, video encoder 200 represents an example of a device configured to encode video data including a memory configured to store video data, and one or more processing units implemented in circuitry and configured to determine a base motion vector predictor in a candidate list for a current block of the video data, wherein the base motion vector predictor is a bi-prediction motion vector predictor; determine a first distance offset and a direction index based on a first motion vector difference (MVD), the first MVD indicating a difference from a first motion vector; determine, based on whether a first and second reference picture of the base motion vector predictor are both from the same reference picture list (or the first and second reference picture of the base motion vector predictor are both after the current picture in playback order (in the future) or both before the current picture in playback order (in the past)), whether a sign value of a second MVD is opposite a sign value for the first MVD, the second MVD indicating a difference from a second motion vector; determine a second distance offset based on the second MVD, wherein the second distance offset corresponds to a reference picture list 1; signal the first distance offset and the direction index, wherein the first distance offset and the second distance offset are asymmetrical, and wherein the second distance offset is not signaled; use the first motion vector and the second motion vector to generate a prediction block; generate residual data based on the prediction block and the current block; and encode the residual data.

In another example, video encoder 200 represents an example of a device configured to encode video data including a memory configured to store video data, and one or more processing units implemented in circuitry and configured to determine a base motion vector predictor in a candidate list for a current block of the video data, wherein the base motion vector predictor is a bi-prediction motion vector predictor; determine a first distance offset and a direction index of a first motion vector difference (MVD) that indicates a difference of a first motion vector from the base motion vector predictor, wherein the first MVD is a reference picture list MVD; determine a second distance offset of a second MVD that indicates a difference of a second motion vector from the base motion vector predictor, wherein the second MVD is a reference picture list 1 MVD; signal a syntax element that indicates whether the reference picture list 1 MVD exists in the bitstream; based on the L1 MVD existing in the bitstream, signal the first distance offset, the second distance offset, the first direction index, and the second direction index, wherein the first distance offset and the second distance offset are asymmetrical or the first direction index and the second direction index are asymmetrical; use the first motion vector and the second motion vector to generate a prediction block; generate residual data based on the prediction block and the current block; and encode the residual data.

In another example, video encoder 200 represents an example of a device configured to encode video data including a memory configured to store video data, and one or more processing units implemented in circuitry and configured to determine a base motion vector predictor in a candidate list for a current block of the video data; determine a first motion vector predictor (MVD) based on a first motion vector and the base motion vector predictor; determine a second motion vector predictor (MVD) based on a second motion vector and the base motion vector predictor, wherein the first MVD and the second MVD are asymmetrical; signal magnitudes of a first and second component of the first MVD and magnitudes of a first and second component of the second MVD; use the first motion vector and the second motion vector to generate a prediction block; generate residual data based on the prediction block and the current block; and encode the residual data.

In another example, this disclosure describes video encoder 200 represents an example of a device configured to encode video data including a memory configured to store video data, and one or more processing units implemented in circuitry and configured to signal, in a bitstream that includes an encoded representation of the video data, a syntax element that indicates whether uni-directional Merge Mode with Motion Vector Difference (MMVD) mode is used; determine a base motion vector predictor in a candidate list for a current block of the video data, wherein the base motion vector predictor is a bi-prediction motion vector predictor; determine a first distance offset and a first direction index based on a first motion vector and the base motion vector predictor; signal the distance offset and the direction index; use the first motion vector to generate a prediction block; generate residual data based on the prediction block and the current block; and encode the residual data.

In this manner, video encoder 200 represents an example of a device for decoding video data including a memory (e.g., video data memory 230 and DPB 218) configured to store video data; and one or more processors (e.g., mode selection unit 202, inter prediction unit 222, reconstruction unit 214, inverse quantization unit 210, and inverse transform processing unit 212) implemented in circuitry and configured to: determine merge mode information for a current block of the video data, the merge mode information indicating that motion information for a current block is to be predicted using a first predictor motion vector and a second predictor motion vector; determine a first motion vector difference (MVD) for the first predictor motion vector and a second MVD for the second predictor motion vector, the second MVD being different than the first MVD; form a first motion vector, the first motion vector corresponding to a combination of the first motion vector predictor and the first MVD; form a second motion vector, the second motion vector corresponding to a combination of the second motion vector predictor and the second MVD; generate a prediction block using the first motion vector and the second motion vector; and decode the current block using the prediction block.

Figure 9:
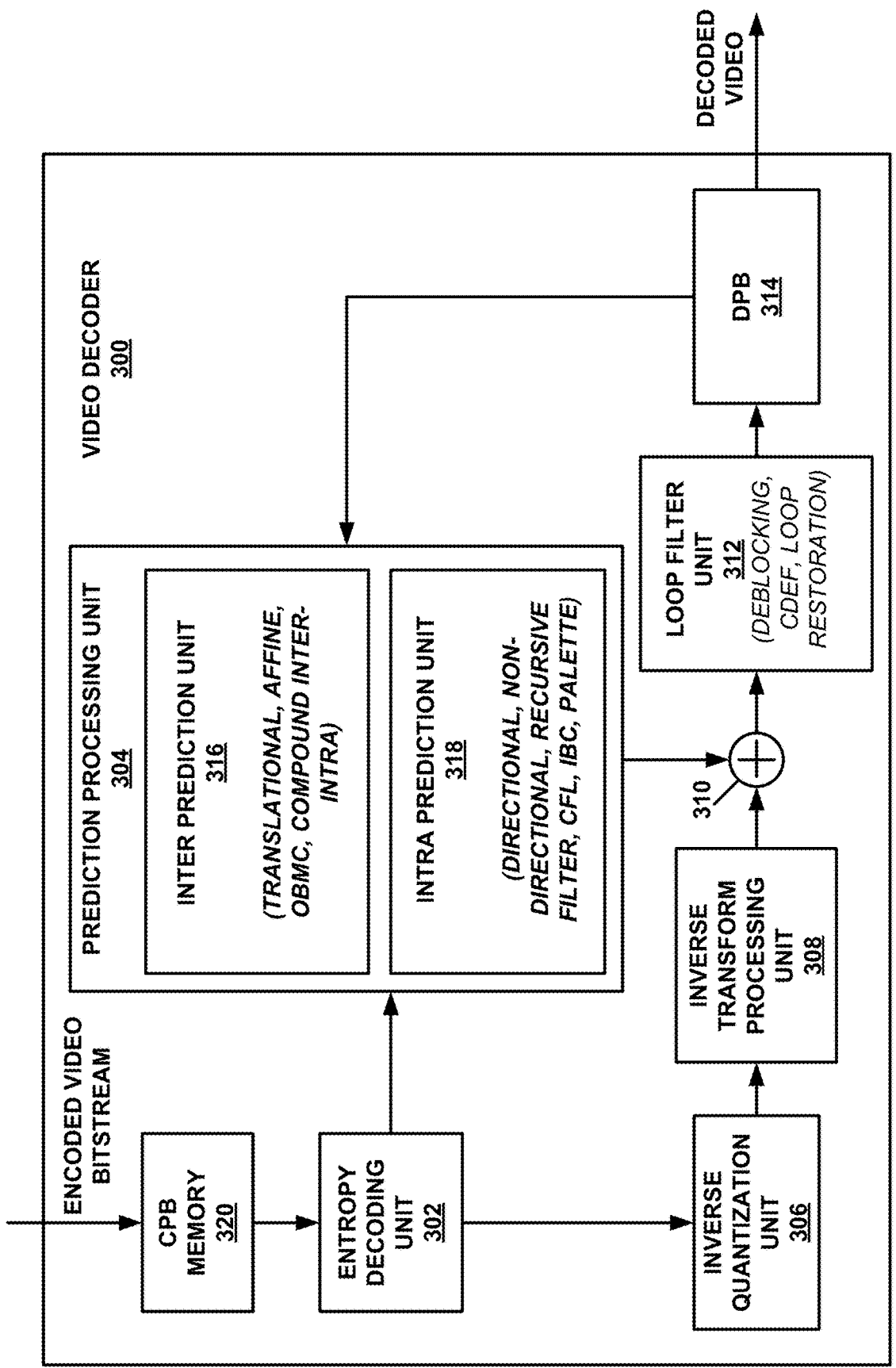
FIG. 9 is a block diagram illustrating an example video decoder that may perform the techniques of this disclosure.

FIG. 9 is a block diagram illustrating an example video decoder 300 that may perform the techniques of this disclosure. FIG. 9 is provided for purposes of explanation and is not limiting on the techniques as broadly exemplified and described in this disclosure. For purposes of explanation, this disclosure describes video decoder 300 according to the techniques of the AV 1 video coding format. However, the techniques of this disclosure may be performed by video decoding devices that are configured to decode video data according to other video coding formats and/or various other video coding standards.

In the example of FIG. 9, video decoder 300 includes coded picture buffer (CPB) memory 320, entropy decoding unit 302, prediction processing unit 304, inverse quantization unit 306, inverse transform processing unit 308, reconstruction unit 310, loop filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, loop filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes inter prediction unit 316 and intra prediction unit 318. Inter prediction unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above. Prediction processing unit 304 may include additional functional units to perform video prediction in accordance with other prediction modes.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. For example, as will be explained below, CPB memory 320 may include a first buffer and a second buffer for storing the sums and averages of reconstructed luma sample values for CFL prediction.

DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 9 are illustrated to assist with understanding the operations performed by video decoder 300. The units may be implemented as fixed-function circuits, programmable circuits, or a combination thereof. Similar to FIG. 8, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from CPB memory 320 and entropy decodes the video data to reproduce syntax elements. Prediction processing unit 304, inverse quantization unit 306, inverse transform processing unit 308, reconstruction unit 310, and loop filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current coding block. For example, inverse transform processing unit 308 may apply a horizontal/vertical combination of an inverse DCT, inverse ADST, inverse flipped ADST, or an inverse identity transform.

Furthermore, prediction processing unit 304 generates prediction samples according to prediction information syntax elements that were entropy decoded by entropy decoding unit 302. For example, if the prediction information syntax elements indicate that the current block is inter predicted, inter prediction unit 316 may generate the prediction samples. In this case, the prediction information syntax elements may indicate a reference picture in DPB 314 from which to retrieve a reference block, as well as a motion vector identifying a location of the reference block in the reference picture relative to the location of the current block in the current picture. Inter prediction unit 316 may generally perform the inter prediction process in a manner that is substantially similar to that described with respect to inter prediction unit 222 (FIG. 8). In some examples, inter prediction unit 316 may perform the techniques for MMVD merge mode with asymmetric motion vector differences and other techniques described in this disclosure.

When a current block (e.g., a CU) is predicted using bi-directional inter prediction, entropy decoding unit 302 may decode merge information for a current block, where the merge information may include a merge index and MVD values. In some examples, entropy decoding unit 302 may decode a syntax element indicating whether MVD values will be provided for both motion vectors of a bi-directionally inter-predicted block. In some examples, if a merge index is less than a threshold, entropy decoding unit 302 may determine that MVD values will be provided for both motion vectors, otherwise that only a single MVD value will be provided. Thus, when decoding motion information for a bi-directionally inter predicted block using merge with motion vector difference (MMVD) mode, entropy decoding unit 302 may decode a merge index and respective MVD values, but may be configured to determine that reference picture list and reference picture index values will not be included in the motion information for the current block.

Entropy decoding unit 302 may provide the merge index and MVD values to inter-prediction unit 316. Inter prediction unit 316 use the merge index and MVD values to reproduce motion information representing two motion vectors used to predict the current block. For example, inter prediction unit 316 may construct a merge candidate list including motion information of neighboring blocks to the current block. Inter prediction unit 316 may, in some examples, limit the merge candidate list to only include candidates that are bi-predicted. Inter prediction unit 316 may use a merge candidate index to determine a candidate including motion vectors to be used as motion vector predictors (also referred to herein as "predictor motion vectors.")

Furthermore, inter prediction unit 316 may receive MVD values for each of the motion vectors used to predict the current block. In some examples, the MVD values may include respective offset values (e.g., offset indexes) representing magnitudes of the offsets. In some examples, the MVD values may include respective direction indexes representing directions for the MVDs. In some examples, the MVD values may include only a single direction index representing directions for the MVDs. If a single direction index is included, in some examples, if the two motion vectors refer to reference pictures in the same reference picture list, the direction may be the same for the two MVDs, whereas if the two motion vectors refer to reference pictures in different reference picture lists, the directions may be opposite between the two motion vectors (e.g., up for the first motion vector and down for the second motion vector). Alternatively, the MVDs may include respective x- and y-components.

Inter prediction unit 316 may use the MVD values and the motion vector predictors to form the motion vectors for the current block. In particular, inter prediction unit 316 may add the first MVD to the first motion vector predictor and the second MVD to the second motion vector predictor.

As another example, if the prediction information syntax elements indicate that the current block is intra predicted, intra prediction unit 318 may generate the prediction samples according to an intra prediction mode indicated by the prediction information syntax elements. Again, intra prediction unit 318 may generally perform the intra prediction process in a manner that is substantially similar to that described with respect to intra prediction unit 226 (FIG. 8). Intra prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding prediction samples to reconstruct the current block.

Loop filter unit 312 may perform one or more filter operations on reconstructed blocks. For example, loop filter unit 312 may perform deblocking operations to reduce blockiness artifacts along edges of the reconstructed blocks. In other examples, loop filter unit 312 may apply a constrained directional enhancement filter (CDEF), which may be applied after deblocking. and may include the application of non-separable non-linear low-pass directional filters based on estimated edge directions. Loop filter unit 312 may also include a loop restoration filter, which is applied after CDEF, and may include a separable symmetric normalized Wiener filter or a dual self-guided filter. Operations of loop filter unit 312 are not necessarily performed in all examples.

Video decoder 300 may store the reconstructed blocks in DPB 314. For instance, in examples where operations of loop filter unit 312 are not performed, reconstruction unit 310 may store reconstructed blocks to DPB 314. In examples where operations of loop filter unit 312 are performed, loop filter unit 312 may store the filtered reconstructed blocks to DPB 314. As discussed above, DPB 314 may provide reference information, such as samples of a current picture for intra prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to obtain a bitstream that includes an encoded representation of the video data; determine a base motion vector predictor in a candidate list for a current block of the video data; determine a first distance offset, a second distance offset, a first direction index, and a second direction index, wherein at least one of: the first distance offset and the second distance offset are asymmetrical or the first direction index and the second direction index are asymmetrical; determine a first motion vector based on the base motion vector predictor, the first distance offset, and the first direction index; determine a second motion vector based on the base motion vector predictor, the second distance offset, and the second direction index; use the first motion vector and the second motion vector to generate a prediction block; and reconstruct the current block based on the prediction block.

In another example, video decoder 300 represents an example of a video decoding device including a memory configured to store video data, and one or more processing units implemented in circuitry and configured to determine a base motion vector predictor in a candidate list for a current block of the video data, wherein the base motion vector predictor is a bi-prediction motion vector predictor; obtain a first distance offset, a second distance offset, and a direction index, wherein the first distance offset and the second distance offset are asymmetrical, and wherein the first distance offset, the second distance offset, and the direction index are signaled in a bitstream that includes an encoded representation of the video data; determine a first motion vector difference (MVD) based on the first distance offset and the direction index; determine a second MVD based on the second distance offset and the direction index, wherein determining the second MVD comprises determining, based on whether a first and second reference picture of the base motion vector predictor are both from the same reference picture list, whether a sign value of the second MVD is opposite a sign value for the first MVD; determine a first motion vector based on the base motion vector predictor and the first MVD; determine a second motion vector based on the base motion vector predictor and the second MVD; use the first motion vector and the second motion vector to generate a prediction block; and reconstruct the current block based on the prediction block.

In another example, video decoder 300 represents an example of a decoding device including a memory configured to store video data, and one or more processing units implemented in circuitry and configured to determine a base motion vector predictor in a candidate list for a current block of a current picture of the video data, wherein the base motion vector predictor is a bi-prediction motion vector predictor; obtain a first distance offset, a second distance offset, and a direction index, wherein the first distance offset and the second distance offset are asymmetrical, and wherein the first distance offset, the second distance offset, and the direction index are signaled in a bitstream that includes an encoded representation of the video data; determine a first motion vector difference (MVD) based on the first distance offset and the direction index; determine a second MVD based on the second distance offset and the direction index, wherein determining the second MVD comprises determining, based on whether a first and second reference picture of the base motion vector predictor are both after the current picture in playback order or both before the current picture in playback order, whether a sign value of the second MVD is opposite a sign value for the first MVD; determine a first motion vector based on the base motion vector predictor and the first MVD; determine a second motion vector based on the base motion vector predictor and the second MVD; use the first motion vector and the second motion vector to generate a prediction block; and reconstruct the current block based on the prediction block.

In another example, video decoder 300 represents an example of a video decoding device including a memory configured to store video data, and one or more processing units implemented in circuitry and configured to obtain a bitstream that includes an encoded representation of the video data; determine a base motion vector predictor in a candidate list for a current block of the video data, wherein the base motion vector predictor is a bi-prediction motion vector predictor; determine, based on a syntax element indicating whether a reference picture list 1 (L1) motion vector difference (MVD) exists in the bitstream, whether the bitstream includes a first distance offset, a second distance offset, a first direction index, and a second direction index; based on the bitstream including a syntax element that indicates that the L1 MVD exists in the bitstream, determine a first distance offset, a second distance offset, a first direction index, and a second direction index, wherein the first distance offset and the second distance offset are asymmetrical or the first direction index and the second direction index are asymmetrical; determine a first motion vector difference (MVD) based on the first distance offset and the direction index; determine a second MVD based on the second distance offset and the direction index; determine a first motion vector based on the base motion vector predictor and the first MVD; determine a second motion vector based on the base motion vector predictor and the second MVD; use the first motion vector and the second motion vector to generate a prediction block; and reconstruct the current block based on the prediction block.

In another example, video decoder 300 represents an example of a video decoding device including a memory configured to store video data, and one or more processing units implemented in circuitry and configured to obtain a bitstream that includes an encoded representation of the video data; determine a base motion vector predictor in a candidate list for a current block of the video data; determine magnitudes of a first and second component of a first motion vector difference (MVD) and magnitudes of a first and second component of a second MVD, wherein the first MVD and the second MVD are asymmetrical; determine a first motion vector based on the base motion vector predictor and the first MVD; determine a second motion vector based on the base motion vector predictor and the second MVD; use the first motion vector and the second motion vector to generate a prediction block; and reconstruct the current block based on the prediction block.

In another example, video decoder 300 represents an example of a video decoding device including a memory configured to store video data, and one or more processing units implemented in circuitry and configured to obtain, from a bitstream that includes an encoded representation of the video data, a syntax element that indicates whether uni-directional Merge Mode with Motion Vector Difference (MMVD) mode is used; determine a base motion vector predictor in a candidate list for a current block of the video data, wherein the base motion vector predictor is a bi-prediction motion vector predictor; determine a distance offset and a direction index; determining a first motion vector based on the base motion vector predictor, the first distance offset, and the first direction index; use the first motion vector to generate a prediction block; and reconstruct the current block based on the prediction block.

In this manner, video decoder 300 represents an example of a device for decoding video data including a memory (e.g., CPB memory 320 and DPB 314) configured to store video data; and one or more processors (e.g., prediction processing unit 304, inter prediction unit 316, reconstruction unit 310, inverse quantization unit 306, and inverse transform processing unit 308) implemented in circuitry and configured to: determine merge mode information for a current block of the video data, the merge mode information indicating that motion information for a current block is to be predicted using a first predictor motion vector and a second predictor motion vector; determine a first motion vector difference (MVD) for the first predictor motion vector and a second MVD for the second predictor motion vector, the second MVD being different than the first MVD; form a first motion vector, the first motion vector corresponding to a combination of the first motion vector predictor and the first MVD; form a second motion vector, the second motion vector corresponding to a combination of the second motion vector predictor and the second MVD; generate a prediction block using the first motion vector and the second motion vector; and decode the current block using the prediction block.

Figure 10:
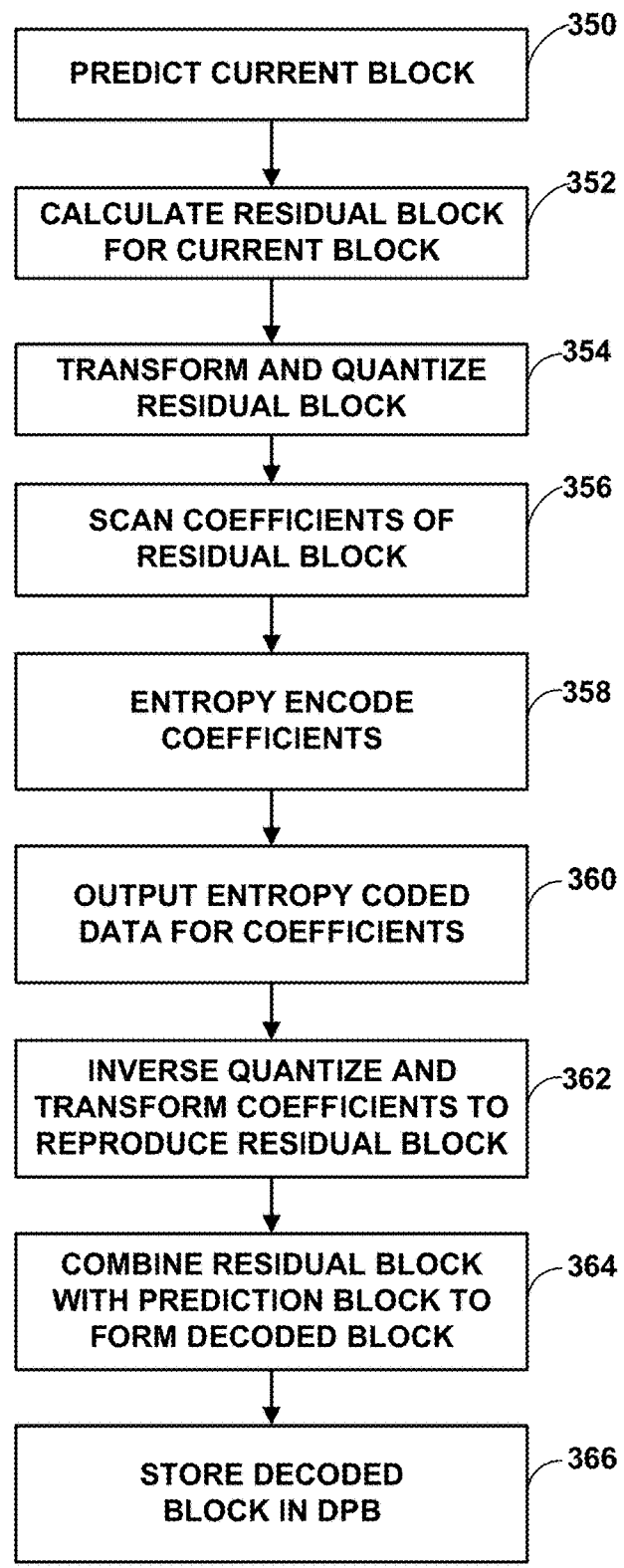
FIG. 10 is a flowchart illustrating an example method of encoding and decoding video data according to the techniques of this disclosure.

FIG. 10 is a flowchart illustrating an example method for encoding a current block in accordance with the techniques of this disclosure. The current block may comprise a current CU. Although described with respect to video encoder 200 (FIGS. 1 and 8), it should be understood that other devices may be configured to perform a method similar to that of FIG. 10.

In this example, video encoder 200 initially predicts the current block (350). For example, video encoder 200 may form a prediction block for the current block. In particular, when forming the prediction block for the current block, per the techniques of this disclosure, video encoder 200 may predict the current block using bi-prediction. That is, video encoder 200 may predict the current block using a first motion vector and a second motion vector. In addition, per the techniques of this disclosure, video encoder 200 may encode motion information representing the first and second motion vectors using merge mode. In merge mode, video encoder 200 may encode a merge candidate index identifying a neighboring block to the current block that includes motion vectors used as predictor motion vector, e.g., a first predictor motion vector and a second predictor motion vector.

Furthermore, per the techniques of this disclosure, video encoder 200 may encode both a first motion vector difference (MVD) value for the first motion vector and a second MVD value for the second motion vector. In this manner, video encoder 200 may form the first motion vector as corresponding to a combination of the first motion vector predictor and the first MVD. Likewise, video encoder 200 may form the second motion vector as corresponding to a combination of the second predictor motion vector and the second MVD.

Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 11:
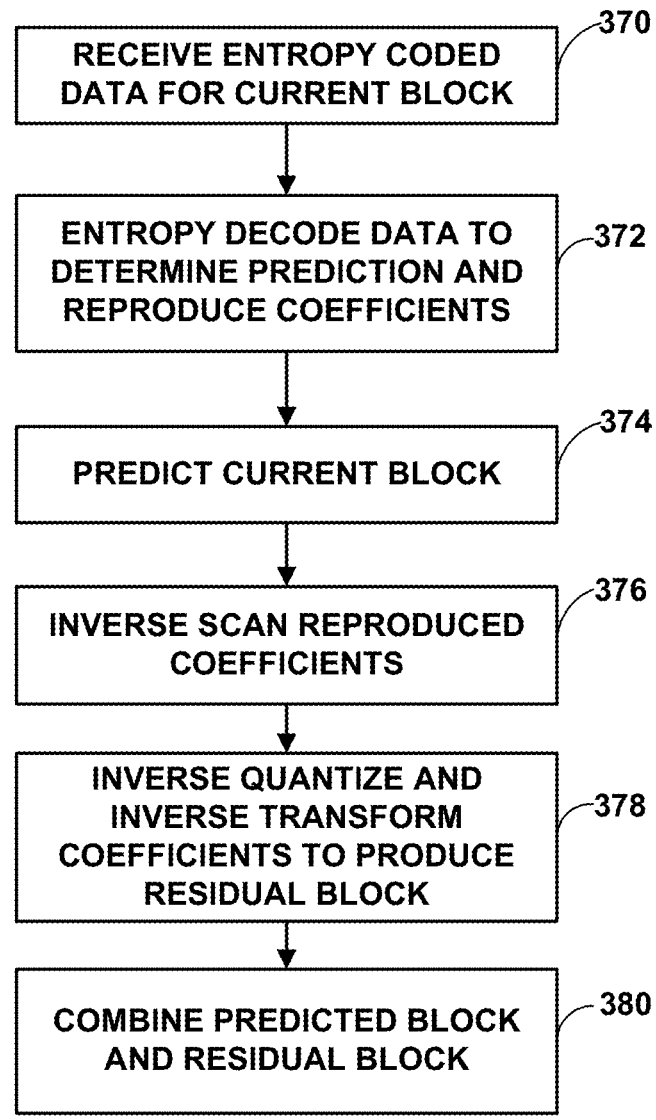
FIG. 11 is a flowchart illustrating an example method of encoding video data according to the techniques of this disclosure.

FIG. 11 is a flowchart illustrating an example method for decoding a current block of video data in accordance with the techniques of this disclosure. The current block may comprise a current CU. Although described with respect to video decoder 300 (FIGS. 1 and 9), it should be understood that other devices may be configured to perform a method similar to that of FIG. 11.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using inter-prediction as indicated by the prediction information for the current block, to calculate a prediction block for the current block.

In particular, when forming a prediction block for the current block, per the techniques of this disclosure, video decoder 300 may predict the current block using bi-prediction. That is, video decoder 300 may predict the current block using a first motion vector and a second motion vector. To form the first and second motion vectors, video decoder 300 may initially decode a merge index identifying a merge candidate neighboring the current block. The merge candidate may include first and second predictor motion vectors. Video decoder 300 may further decode a first motion vector difference (MVD) value and a second MVD value. Video decoder 300 may then form a first motion vector as a combination of the first predictor motion vector and the first MVD value. Likewise, video decoder 300 may form the second motion vector as a combination of the second predictor motion vector and the second MVD value. Video decoder 300 may then use the first and second motion vectors to form the prediction block for the current block.

Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 12:
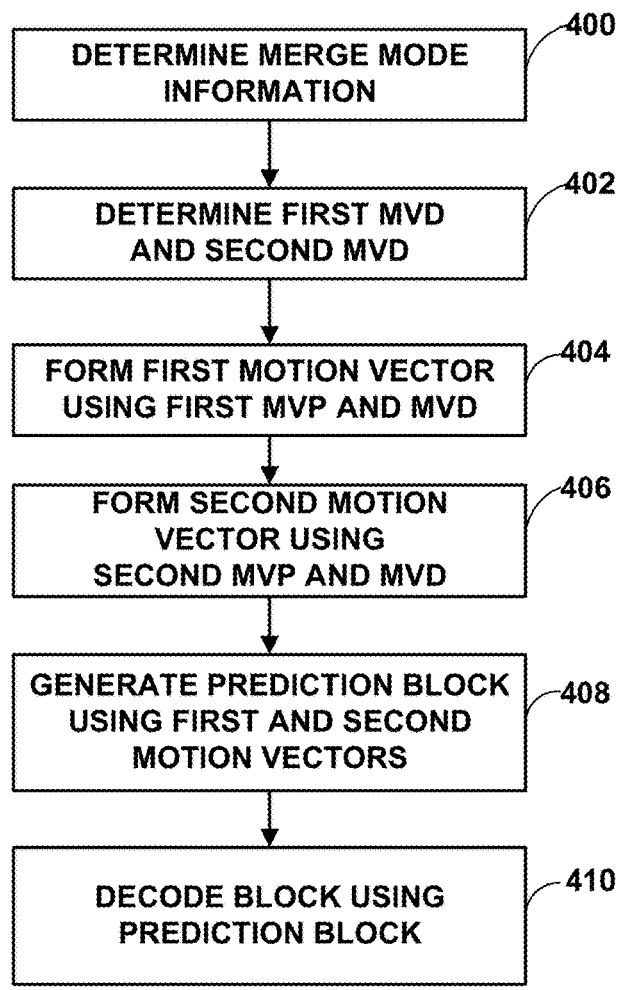
FIG. 12 is a flowchart illustrating another example method of decoding video data according to the techniques of this disclosure.

FIG. 12 is a flowchart illustrating another example method of decoding video data according to the techniques of this disclosure. The method of FIG. 12 is explained with respect to video decoder 300 of FIGS. 1 and 9. However, video encoder 200 or other video coding devices may be configured to perform this or a similar method.

Initially, video decoder 300 may determine (e.g., decode) merge mode information (400) for a current block of video data. The merge mode information may indicate that the current block is to be predicted using a first predictor motion vector and a second predictor motion vector. For example, the merge mode information may refer to a neighboring block to the current block, where the neighboring block was predicted using bi-prediction. That is, the first predictor motion vector may refer to a prediction block of a reference picture in reference picture list 1, and the second predictor motion vector may refer to a prediction block of a reference picture in reference picture list 2. Alternatively, the merge mode information may include first and second merge candidate indexes, where the first merge candidate index refers to a first entry in a geometric partition mode (GPM) candidate list and the second merge candidate index refers to a second entry in the GPM candidate list.

In some examples, video decoder 300 may determine whether the merge mode information includes a merge index having a value less than a threshold. In the case that the merge index is less than the threshold, video decoder 300 may determine that both a first and second motion vector difference (MVD) value are coded for the current block, whereas if the merge index is greater than the threshold, video decoder 300 may determine that only a single MVD value is coded for the current block.

Video decoder 300 may then determine (e.g., decode) first and second MVD values (402) for the current block. In some examples, video decoder 300 may decode a first offset index representing a first magnitude for the first MVD and a second offset index representing a second magnitude for the second MVD. In some examples, video decoder 300 may decode first and second direction indexes for the first and second MVDs respectively.

In some examples, video decoder 300 may decode a single direction index indicating a first direction for the first MVD and a second direction for the second MVD. In some examples, if the first predictor motion vector refers to a first reference picture in a first reference picture list and the second predictor motion vector refers to a second reference picture in a second, different reference picture list, the first and second directions may be opposite of one another. In some examples, if the first predictor motion vector refers to a first reference picture in a first reference picture list and the second predictor motion vector refers to a second reference picture in the first reference picture list, the first direction may be equal to the second direction. Thus, the single direction index may indicate the same or opposite directions for the first and second MVDs.

In some examples, video decoder 300 may decode a first x-component and a first y-component for the first MVD and a second x-component and a second y-component for the second MVD, as in AMVP mode.

Video decoder 300 may then form a first motion vector using the first predictor motion vector (MVP) and the first MVD (404) and a second motion vector using the second predictor motion vector (MVP) and the second MVD (406). For example, video decoder 300 may combine the first MVP with the first MVD and the second MVP with the second MVD.

Video decoder 300 may then generate a prediction block for the current block using the first and second motion vectors (408). For example, video decoder 300 may retrieve a first reference block using the first motion vector and a second reference block using the second motion vector. Video decoder 300 may then combine the first and second reference blocks, e.g., on a sample by sample basis with equal weights for the first and second reference blocks. Ultimately, video decoder 300 may decode the current block using the prediction block (410). For example, video decoder 300 may decode a residual block as discussed above and combine samples of the residual block with samples of the prediction block.

In this manner, the method of FIG. 12 represents an example of a method of decoding video data including determining merge mode information for a current block, the merge mode information indicating that motion information for a current block is to be predicted using a first predictor motion vector and a second predictor motion vector; determining a first motion vector difference (MVD) for the first predictor motion vector and a second MVD for the second predictor motion vector, the second MVD being different than the first MVD; forming a first motion vector, the first motion vector corresponding to a combination of the first motion vector predictor and the first MVD; forming a second motion vector, the second motion vector corresponding to a combination of the second motion vector predictor and the second MVD; generating a prediction block using the first motion vector and the second motion vector; and decoding the current block using the prediction block.

The following clauses provide a non-limiting list of examples in accordance with one or more techniques of this disclosure.

Clause 1: A method of decoding video data includes obtaining a bitstream that includes an encoded representation of the video data; determining a base motion vector predictor in a candidate list for a current block of the video data; determining a first distance offset, a second distance offset, a first direction index, and a second direction index, wherein at least one of: the first distance offset and the second distance offset are asymmetrical or the first direction index and the second direction index are asymmetrical; determining a first motion vector based on the base motion vector predictor, the first distance offset, and the first direction index; determining a second motion vector based on the base motion vector predictor, the second distance offset, and the second direction index; using the first motion vector and the second motion vector to generate a prediction block; and reconstructing the current block based on the prediction block.

Clause 2: A method of decoding video data includes determining a base motion vector predictor in a candidate list for a current block of the video data, wherein the base motion vector predictor is a bi-prediction motion vector predictor; obtaining a first distance offset, a second distance offset, and a direction index, wherein the first distance offset and the second distance offset are asymmetrical, and wherein the first distance offset, the second distance offset, and the direction index are signaled in a bitstream that includes an encoded representation of the video data; determining a first motion vector difference (MVD) based on the first distance offset and the direction index; determining a second MVD based on the second distance offset and the direction index, wherein determining the second MVD comprises determining, based on whether a first and second reference picture of the base motion vector predictor are both from the same reference picture list, whether a sign value of the second MVD is opposite a sign value for the first MVD; determining a first motion vector based on the base motion vector predictor and the first MVD; determining a second motion vector based on the base motion vector predictor and the second MVD; using the first motion vector and the second motion vector to generate a prediction block; and reconstructing the current block based on the prediction block.

Clause 3: The method of clauses 1 or 2, wherein: the second distance offset and the second direction index, if present, correspond to a reference picture list 1, and determining the second distance offset and the second direction index comprises determining that the second distance offset and the second direction index are not signaled.

Clause 4: A method of decoding video data includes obtaining a bitstream that includes an encoded representation of the video data; determining a base motion vector predictor in a candidate list for a current block of the video data, wherein the base motion vector predictor is a bi-prediction motion vector predictor; determining, based on a syntax element indicating whether a reference picture list 1 (L1) motion vector difference (MVD) exists in the bitstream, whether the bitstream includes a first distance offset, a second distance offset, a first direction index, and a second direction index; based on the bitstream including a syntax element that indicates that the L1 MVD exists in the bitstream, determining a first distance offset, a second distance offset, a first direction index, and a second direction index, wherein the first distance offset and the second distance offset are asymmetrical or the first direction index and the second direction index are asymmetrical; determining a first motion vector difference (MVD) based on the first distance offset and the direction index; determining a second MVD based on the second distance offset and the direction index; determining a first motion vector based on the base motion vector predictor and the first MVD; determining a second motion vector based on the base motion vector predictor and the second MVD; using the first motion vector and the second motion vector to generate a prediction block; and reconstructing the current block based on the prediction block.

Clause 5: A method of decoding video data includes obtaining a bitstream that includes an encoded representation of the video data; determining a base motion vector predictor in a candidate list for a current block of the video data; determining magnitudes of a first and second component of a first motion vector difference (MVD) and magnitudes of a first and second component of a second MVD, wherein the first MVD and the second MVD are asymmetrical; determining a first motion vector based on the base motion vector predictor and the first MVD; determining a second motion vector based on the base motion vector predictor and the second MVD; using the first motion vector and the second motion vector to generate a prediction block; and reconstructing the current block based on the prediction block.

Clause 6: The method of any of clauses 1-5, the method further comprises: obtaining, from the bitstream, a syntax element; and performing a merge candidate list construction process that generates the candidate list such that, depending on a value of the syntax element, uni-prediction candidates are dropped from the candidate list.

Clause 7: The method of any of clauses 1-5, further includes performing a merge candidate list construction process that generates the candidate list such that the candidate list includes entries reserved only for bi-prediction motion candidates.

Clause 8: The method of clause 7, wherein performing the merge candidate list construction process that generates the candidate list such that the candidate list includes entries reserved only for bi-prediction motion candidates comprises: based on a syntax element indicating that a L1 motion vector difference exists in the bitstream, performing the merge candidate list construction process that generates the candidate list such that the candidate list includes the entries reserved only for bi-prediction motion candidates.

Clause 9: The method of any of clauses 1-6, wherein determining the base motion vector predictor comprises: inferring the base motion vector predictor from a geometric partitioning mode (GPM) candidate list through two merge candidate indices pointing to two entries in the GPM candidate list.

Clause 10: A method of decoding video data includes obtaining, from a bitstream that includes an encoded representation of the video data, a syntax element that indicates whether uni-directional Merge Mode with Motion Vector Difference (MMVD) mode is used; determining a base motion vector predictor in a candidate list for a current block of the video data, wherein the base motion vector predictor is a bi-prediction motion vector predictor; determining a distance offset and a direction index; determining a first motion vector based on the base motion vector predictor, the first distance offset, and the first direction index; using the first motion vector to generate a prediction block; and reconstructing the current block based on the prediction block.

Clause 11: The method of clause 10, wherein the syntax element also indicates whether a geometric partitioning mode (GPM) merge candidate list is used.

Clause 12: The method of any of clauses 10-11, wherein the syntax element also indicates whether a merge candidate list construction process only accepts filling uni-prediction motion candidates.

Clause 13: The method of any of clauses 10-12, further includes determining, based on block-level information signaled in the bitstream, whether an inter prediction direction of the current block is uni-directional or bi-directional; and applying uni-directional prediction or asymmetric MMVD depending on whether the inter prediction direction of the current block is uni-directional prediction or bi-directional.

Clause 14: A method of encoding video data includes determining a base motion vector predictor in a candidate list for a current block of the video data; determining a first distance offset and a first direction index based on a first motion vector and the base motion vector predictor; determining a second distance offset and a second direction index based on a second motion vector and the base motion vector predictor, wherein at least one of: the first distance offset and the second distance offset are asymmetrical or the first direction index and the second direction index are asymmetrical; using the first motion vector and the second motion vector to generate a prediction block; generating residual data based on the prediction block and the current block; and encoding the residual data.

Clause 15: A method of encoding video data includes determining a base motion vector predictor in a candidate list for a current block of the video data, wherein the base motion vector predictor is a bi-prediction motion vector predictor; determining a first distance offset and a direction index based on a first motion vector difference (MVD), the first MVD indicating a difference from a first motion vector; determining, based on whether a first and second reference picture of the base motion vector predictor are both from the same reference picture list, whether a sign value of a second MVD is opposite a sign value for the first MVD, the second MVD indicating a difference from a second motion vector; determining a second distance offset based on the second MVD; signaling the first distance offset, the second distance offset, and the direction index, wherein the first distance offset and the second distance offset are asymmetrical, and wherein the first distance offset; using the first motion vector and the second motion vector to generate a prediction block; generating residual data based on the prediction block and the current block; and encoding the residual data.

Clause 16: A method of encoding video data includes determining a base motion vector predictor in a candidate list for a current block of the video data, wherein the base motion vector predictor is a bi-prediction motion vector predictor; determining a first distance offset and a direction index based on a first motion vector difference (MVD), the first MVD indicating a difference from a first motion vector; determining, based on whether a first and second reference picture of the base motion vector predictor are both from the same reference picture list, whether a sign value of a second MVD is opposite a sign value for the first MVD, the second MVD indicating a difference from a second motion vector; determining a second distance offset based on the second MVD, wherein the second distance offset corresponds to a reference picture list 1; signaling the first distance offset and the direction index, wherein the first distance offset and the second distance offset are asymmetrical, and wherein the second distance offset is not signaled; using the first motion vector and the second motion vector to generate a prediction block; generating residual data based on the prediction block and the current block; and encoding the residual data.

Clause 17: A method of encoding video data includes determining a base motion vector predictor in a candidate list for a current block of the video data, wherein the base motion vector predictor is a bi-prediction motion vector predictor; determining a first distance offset and a direction index of a first motion vector difference (MVD) that indicates a difference of a first motion vector from the base motion vector predictor, wherein the first MVD is a reference picture list MVD; determining a second distance offset of a second MVD that indicates a difference of a second motion vector from the base motion vector predictor, wherein the second MVD is a reference picture list 1 MVD; signaling a syntax element that indicates whether the reference picture list 1 MVD exists in the bitstream; based on the L1 MVD existing in the bitstream, signaling the first distance offset, the second distance offset, the first direction index, and the second direction index, wherein the first distance offset and the second distance offset are asymmetrical or the first direction index and the second direction index are asymmetrical; using the first motion vector and the second motion vector to generate a prediction block; generating residual data based on the prediction block and the current block; and encoding the residual data.

Clause 18: A method of encoding video data includes determining a base motion vector predictor in a candidate list for a current block of the video data; determining a first motion vector predictor (MVD) based on a first motion vector and the base motion vector predictor; determining a second motion vector predictor (MVD) based on a second motion vector and the base motion vector predictor, wherein the first MVD and the second MVD are asymmetrical; signaling magnitudes of a first and second component of the first MVD and magnitudes of a first and second component of the second MVD; using the first motion vector and the second motion vector to generate a prediction block; generating residual data based on the prediction block and the current block; and encoding the residual data.

Clause 19: The method of any of clauses 14-18, the method further comprises: signaling, in the bitstream, a syntax element; and performing a merge candidate list construction process that generates the candidate list such that, depending on a value of the syntax element, uni-prediction candidates are dropped from the candidate list.

Clause 20: The method of any of clauses 14-19, further includes performing a merge candidate list construction process that generates the candidate list such that the candidate list includes entries reserved only for bi-prediction motion candidates.

Clause 21: The method of clause 20, wherein performing the merge candidate list construction process that generates the candidate list such that the candidate list includes entries reserved only for bi-prediction motion candidates comprises: based on a syntax element indicating that a L1 motion vector difference exists in the bitstream, performing the merge candidate list construction process that generates the candidate list such that the candidate list includes entries reserved only for bi-prediction motion candidates.

Clause 22: The method of any of clauses 14-21, wherein determining the base motion vector predictor comprises: inferring the base motion vector predictor from a geometric partitioning mode (GPM) candidate list through two merge candidate indices pointing to two entries in the GPM candidate list.

Clause 23: A method of encoding video data includes signaling, in a bitstream that includes an encoded representation of the video data, a syntax element that indicates whether uni-directional Merge Mode with Motion Vector Difference (MMVD) mode is used; determining a base motion vector predictor in a candidate list for a current block of the video data, wherein the base motion vector predictor is a bi-prediction motion vector predictor; determining a first distance offset and a first direction index based on a first motion vector and the base motion vector predictor; signaling the distance offset and the direction index; using the first motion vector to generate a prediction block; generating residual data based on the prediction block and the current block; and encoding the residual data.

Clause 24: The method of clause 23, wherein the syntax element also indicates whether a geometric partitioning mode (GPM) merge candidate list is used.

Clause 25: The method of any of clauses 23-24, wherein the syntax element also indicates whether a merge candidate list construction process only accepts filling uni-prediction motion candidates.

Clause 26: The method of any of clauses 23-25, further comprising signaling, in the bitstream, block-level information indicating whether an inter prediction direction of the current block is uni-directional or bi-directional; and applying uni-directional prediction or asymmetric MMVD depending on whether the inter prediction direction of the current block is uni-directional prediction or bi-directional.

Clause 27: A device for encoding or decoding video data, the device comprising one or more means for performing the method of any of clauses 1-26.

Clause 28: The device of clause 27, wherein the one or more means comprise one or more processors implemented in circuitry.

Clause 29: The device of any of clauses 27 and 28, further comprising a memory to store the video data.

Clause 30: The device of any of clauses 27-29, further comprising a display configured to display decoded video data.

Clause 31: The device of any of clauses 27-30, wherein the device comprises one or more of a camera, a computer, a mobile device, a broadcast receiver device, or a set-top box.

Clause 32: The device of any of clauses 27-31, wherein the device comprises a video decoder.

Clause 33: The device of any of clauses 27-32, wherein the device comprises a video encoder.

Clause 34: A computer-readable storage medium having stored thereon instructions that, when executed, cause one or more processors to perform the method of any of clauses 1-26.

Clause 1A: A method of decoding video data includes obtaining a bitstream that includes an encoded representation of the video data; determining a base motion vector predictor in a candidate list for a current block of the video data; determining a first distance offset, a second distance offset, a first direction index, and a second direction index, wherein at least one of: the first distance offset and the second distance offset are asymmetrical or the first direction index and the second direction index are asymmetrical; determining a first motion vector based on the base motion vector predictor, the first distance offset, and the first direction index; determining a second motion vector based on the base motion vector predictor, the second distance offset, and the second direction index; using the first motion vector and the second motion vector to generate a prediction block; and reconstructing the current block based on the prediction block.

Clause 2A: The method of clause 1A, wherein: the second distance offset and the second direction index correspond to a reference picture list 1, the second distance offset and the second direction index are not signaled in the bitstream, and determining the second motion vector comprises: determining that a motion vector difference (MVD) corresponding to the reference picture list 1 is equal to a zero vector; and determining the second motion vector based on the base motion vector predictor and the MVD corresponding to the reference picture list 1.

Clause 3A: A method of decoding video data includes determining a base motion vector predictor in a candidate list for a current block of a current picture of the video data, wherein the base motion vector predictor is a bi-prediction motion vector predictor; obtaining a first distance offset, a second distance offset, and a direction index, wherein the first distance offset and the second distance offset are asymmetrical, and wherein the first distance offset, the second distance offset, and the direction index are signaled in a bitstream that includes an encoded representation of the video data; determining a first motion vector difference (MVD) based on the first distance offset and the direction index; determining a second MVD based on the second distance offset and the direction index, wherein determining the second MVD comprises determining, based on whether a first and second reference picture of the base motion vector predictor are both after the current picture in playback order or both before the current picture in playback order, whether a sign value of the second MVD is opposite a sign value for the first MVD; determining a first motion vector based on the base motion vector predictor and the first MVD; determining a second motion vector based on the base motion vector predictor and the second MVD; using the first motion vector and the second motion vector to generate a prediction block; and reconstructing the current block based on the prediction block.

Clause 4A: The method of clauses 3A, wherein: the second distance offset, a second direction index, and the second MVD correspond to a reference picture list 1, the second distance offset and the second direction index are not signaled in the bitstream, and determining the second MVD comprises determining that the second MVD is equal to a zero vector.

Clause 5A: A method of decoding video data includes obtaining a bitstream that includes an encoded representation of the video data; determining a base motion vector predictor in a candidate list for a current block of the video data, wherein the base motion vector predictor is a bi-prediction motion vector predictor; determining, based on a syntax element indicating whether a reference picture list 1 (L1) motion vector difference (MVD) exists in the bitstream, whether the bitstream includes a first distance offset, a second distance offset, a first direction index, and a second direction index; based on the syntax element indicating that the L1 MVD exists in the bitstream, determining the first distance offset, the second distance offset, the first direction index, and the second direction index, wherein the first distance offset and the second distance offset are asymmetrical or the first direction index and the second direction index are asymmetrical; determining a first motion vector difference (MVD) based on the first distance offset and the direction index; determining a second MVD based on the second distance offset and the direction index; determining a first motion vector based on the base motion vector predictor and the first MVD; determining a second motion vector based on the base motion vector predictor and the second MVD; using the first motion vector and the second motion vector to generate a prediction block; and reconstructing the current block based on the prediction block.

Clause 6A: A method of decoding video data includes obtaining a bitstream that includes an encoded representation of the video data; determining a base motion vector predictor in a candidate list for a current block of the video data; determining magnitudes of a first and second component of a first motion vector difference (MVD) and magnitudes of a first and second component of a second MVD, wherein the first MVD and the second MVD are asymmetrical; determining a first motion vector based on the base motion vector predictor and the first MVD; determining a second motion vector based on the base motion vector predictor and the second MVD; using the first motion vector and the second motion vector to generate a prediction block; and reconstructing the current block based on the prediction block.

Clause 7A: The method of any of clauses 1A-6A, the method further comprises: obtaining, from the bitstream, a syntax element; and performing a merge candidate list construction process that generates the candidate list such that, depending on a value of the syntax element, uni-prediction candidates are dropped from the candidate list.

Clause 8A: The method of any of clauses 1A-6A, further includes performing a merge candidate list construction process that generates the candidate list such that the candidate list includes entries reserved only for bi-prediction motion candidates.

Clause 9A: The method of clause 8A, wherein performing the merge candidate list construction process that generates the candidate list such that the candidate list includes entries reserved only for bi-prediction motion candidates comprises: based on a syntax element indicating that a L1 motion vector difference exists in the bitstream, performing the merge candidate list construction process that generates the candidate list such that the candidate list includes the entries reserved only for bi-prediction motion candidates.

Clause 10A: The method of any of clauses 1A-7A, wherein determining the base motion vector predictor comprises: inferring the base motion vector predictor from a geometric partitioning mode (GPM) candidate list through two merge candidate indices pointing to two entries in the GPM candidate list.

Clause 11A: A method of decoding video data includes obtaining, from a bitstream that includes an encoded representation of the video data, a syntax element that indicates whether uni-directional Merge Mode with Motion Vector Difference (MMVD) mode is used; determining a base motion vector predictor in a candidate list for a current block of the video data, wherein the base motion vector predictor is a bi-prediction motion vector predictor; determining a distance offset and a direction index; determining a first motion vector based on the base motion vector predictor, the first distance offset, and the first direction index; using the first motion vector to generate a prediction block; and reconstructing the current block based on the prediction block.

Clause 12A: The method of clause 11A, wherein the syntax element also indicates whether a geometric partitioning mode (GPM) merge candidate list is used.

Clause 13A: The method of any of clauses 11A-12A, wherein the syntax element also indicates whether a merge candidate list construction process only accepts filling uni-prediction motion candidates.

Clause 14A: The method of any of clauses 11A-13A, further includes determining, based on block-level information signaled in the bitstream, whether an inter prediction direction of the current block is uni-directional or bi-directional; and applying uni-directional prediction or asymmetric MMVD depending on whether the inter prediction direction of the current block is uni-directional prediction or bi-directional.

Clause 15A: A method of encoding video data includes determining a base motion vector predictor in a candidate list for a current block of the video data; determining a first distance offset and a first direction index based on a first motion vector and the base motion vector predictor; determining a second distance offset and a second direction index based on a second motion vector and the base motion vector predictor, wherein at least one of: the first distance offset and the second distance offset are asymmetrical or the first direction index and the second direction index are asymmetrical; using the first motion vector and the second motion vector to generate a prediction block; generating residual data based on the prediction block and the current block; and encoding the residual data.

Clause 16A: The method of clause 15A, the second distance offset and the second direction index correspond to a reference picture list 1, and the second distance offset and the second direction index are not signaled in the bitstream.

Clause 17A: A method of encoding video data includes determining a base motion vector predictor in a candidate list for a current block of a current picture of the video data, wherein the base motion vector predictor is a bi-prediction motion vector predictor; determining a first distance offset and a direction index based on a first motion vector difference (MVD), the first MVD indicating a difference from a first motion vector; determining, based on whether a first and second reference picture of the base motion vector predictor are both from the first same reference picture list, whether a sign value of a second MVD is opposite a sign value for the first MVD, the second MVD indicating a difference from a second motion vector; determining a second distance offset based on the second MVD; signaling the first distance offset, the second distance offset, and the direction index, wherein the first distance offset and the second distance offset are asymmetrical, and wherein the first distance offset; using the first motion vector and the second motion vector to generate a prediction block; generating residual data based on the prediction block and the current block; and encoding the residual data.

Clause 18A: The method of clause 17A, wherein: the second distance offset, a second direction index, and the second MVD correspond to a reference picture list 1, the second distance offset and the second direction index are not signaled in the bitstream, and the second MVD is equal to a zero vector.

Clause 19A: A method of encoding video data includes determining a base motion vector predictor in a candidate list for a current block of a current picture of the video data, wherein the base motion vector predictor is a bi-prediction motion vector predictor; determining a first distance offset and a direction index based on a first motion vector difference (MVD), the first MVD indicating a difference from a first motion vector; determining, based on whether a first and second reference picture of the base motion vector predictor are both after the current picture in playback order or both before the current picture in playback order, whether a sign value of a second MVD is opposite a sign value for the first MVD, the second MVD indicating a difference from a second motion vector; determining a second distance offset based on the second MVD, wherein the second distance offset corresponds to a reference picture list 1; signaling the first distance offset and the direction index, wherein the first distance offset and the second distance offset are asymmetrical, and wherein the second distance offset is not signaled; using the first motion vector and the second motion vector to generate a prediction block; generating residual data based on the prediction block and the current block; and encoding the residual data.

Clause 20A: A method of encoding video data includes determining a base motion vector predictor in a candidate list for a current block of the video data, wherein the base motion vector predictor is a bi-prediction motion vector predictor; determining a first distance offset and a direction index of a first motion vector difference (MVD) that indicates a difference of a first motion vector from the base motion vector predictor, wherein the first MVD is a reference picture list MVD; determining a second distance offset of a second MVD that indicates a difference of a second motion vector from the base motion vector predictor, wherein the second MVD is a reference picture list 1 MVD; signaling a syntax element that indicates whether the reference picture list 1 MVD exists in the bitstream; based on the L1 MVD existing in the bitstream, signaling the first distance offset, the second distance offset, the first direction index, and the second direction index, wherein the first distance offset and the second distance offset are asymmetrical or the first direction index and the second direction index are asymmetrical; using the first motion vector and the second motion vector to generate a prediction block; generating residual data based on the prediction block and the current block; and encoding the residual data.

Clause 21A: A method of encoding video data includes determining a base motion vector predictor in a candidate list for a current block of the video data; determining a first motion vector predictor (MVD) based on a first motion vector and the base motion vector predictor; determining a second motion vector predictor (MVD) based on a second motion vector and the base motion vector predictor, wherein the first MVD and the second MVD are asymmetrical; signaling magnitudes of a first and second component of the first MVD and magnitudes of a first and second component of the second MVD; using the first motion vector and the second motion vector to generate a prediction block; generating residual data based on the prediction block and the current block; and encoding the residual data.

Clause 22A: The method of any of clauses 17A-21A, the method further comprises: signaling, in the bitstream, a syntax element; and performing a merge candidate list construction process that generates the candidate list such that, depending on a value of the syntax element, uni-prediction candidates are dropped from the candidate list.

Clause 23A: The method of any of clauses 17A-22A, further includes performing a merge candidate list construction process that generates the candidate list such that the candidate list includes entries reserved only for bi-prediction motion candidates.

Clause 24A: The method of clause 23A, wherein performing the merge candidate list construction process that generates the candidate list such that the candidate list includes entries reserved only for bi-prediction motion candidates comprises: based on a syntax element indicating that a L1 motion vector difference exists in the bitstream, performing the merge candidate list construction process that generates the candidate list such that the candidate list includes entries reserved only for bi-prediction motion candidates.

Clause 25A: The method of any of clauses 17A-24A, wherein determining the base motion vector predictor comprises: inferring the base motion vector predictor from a geometric partitioning mode (GPM) candidate list through two merge candidate indices pointing to two entries in the GPM candidate list.

Clause 26A: A method of encoding video data includes signaling, in a bitstream that includes an encoded representation of the video data, a syntax element that indicates whether uni-directional Merge Mode with Motion Vector Difference (MMVD) mode is used; determining a base motion vector predictor in a candidate list for a current block of the video data, wherein the base motion vector predictor is a bi-prediction motion vector predictor; determining a first distance offset and a first direction index based on a first motion vector and the base motion vector predictor; signaling the distance offset and the direction index; using the first motion vector to generate a prediction block; generating residual data based on the prediction block and the current block; and encoding the residual data.

Clause 27A: The method of clause 26A, wherein the syntax element also indicates whether a geometric partitioning mode (GPM) merge candidate list is used.

Clause 28A: The method of any of clauses 26A-27A, wherein the syntax element also indicates whether a merge candidate list construction process only accepts filling uni-prediction motion candidates.

Clause 29A: The method of any of clauses 26A-28A, further comprising signaling, in the bitstream, block-level information indicating whether an inter prediction direction of the current block is uni-directional or bi-directional; and applying uni-directional prediction or asymmetric MMVD depending on whether the inter prediction direction of the current block is uni-directional prediction or bi-directional.

Clause 30A: A device for encoding or decoding video data, the device comprising one or more means for performing the methods of any of clauses 1A-29A.

Clause 31A: The device of clause 30A, wherein the one or more means comprise one or more processors implemented in circuitry.

Clause 32A: The device of any of clauses 30A and 31A, further comprising a memory to store the video data.

Clause 33A: The device of any of clauses 30A-32A, further comprising a display configured to display decoded video data.

Clause 34A: The device of any of clauses 30A-33A, wherein the device comprises one or more of a camera, a computer, a mobile device, a broadcast receiver device, or a set-top box.

Clause 35A: The device of any of clauses 30A-34A, wherein the device comprises a video decoder.

Clause 36A: The device of any of clauses 30A-35A, wherein the device comprises a video encoder.

Clause 37A: A computer-readable storage medium having stored thereon instructions that, when executed, cause one or more processors to perform the methods of any of clauses 1A-29A.

Clause 1B. A method of decoding video data, the method comprising: determining merge mode information for a current block, the merge mode information indicating that motion information for a current block is to be predicted using a first predictor motion vector and a second predictor motion vector; determining a first motion vector difference (MVD) for the first predictor motion vector and a second MVD for the second predictor motion vector, the second MVD being different than the first MVD; forming a first motion vector, the first motion vector corresponding to a combination of the first motion vector predictor and the first MVD; forming a second motion vector, the second motion vector corresponding to a combination of the second motion vector predictor and the second MVD; generating a prediction block using the first motion vector and the second motion vector; and decoding the current block using the prediction block.

Clause 2B. The method of clause 1B, wherein determining the second MVD comprises determining that the second MVD is zero-valued.

Clause 3B. The method of clause 1B, wherein determining the first MVD comprises decoding a first offset index representing a magnitude for the first MVD, and wherein determining the second MVD comprises decoding a second offset index representing a magnitude for the second MVD.

Clause 4B. The method of clause 3B, wherein determining the first MVD further comprises decoding a first direction index indicating a direction for the first MVD, and wherein determining the second MVD further comprises decoding a second direction index indicating a direction for the second MVD.

Clause 5B. The method of clause 3B, further comprising decoding a direction index representing a first direction for the first MVD and a second direction for the second MVD.

Clause 6B. The method of clause 5B, wherein when the first predictor motion vector refers to a first reference picture in a first reference picture list and the second predictor motion vector refers to a second reference picture in a second reference picture list, the first direction is opposite of the second direction.

Clause 7B. The method of clause 5B, wherein when the first predictor motion vector refers to a first reference picture in a first reference picture list and the second predictor motion vector refers to a second reference picture in the first reference picture list, the first direction is equal to the second direction.

Clause 8B. The method of clause 1B, further comprising coding a value for a syntax element indicating that the second MVD is to be decoded.

Clause 9B. The method of clause 8B, wherein the syntax element is a coding unit (CU)-level syntax element of the current block.

Clause 10B. The method of clause 1B, wherein determining the first MVD comprises decoding a first x-component and a first y-component of the first MVD, and wherein determining the second MVD comprises decoding a second x-component and a second y-component of the second MVD.

Clause 11B. The method of clause 1B, wherein the merge mode information comprises a merge index having a value less than a threshold.

Clause 12B. The method of clause 1B, wherein the merge mode information comprises a first merge candidate index referring to a first entry in a geometric partition mode (GPM) candidate list and a second merge candidate index referring to a second entry in the GPM candidate list.

Clause 13B. The method of clause 1B, further comprising coding a value of a syntax element indicating that uni-directional merge with MVD (MMVD) is not to be used for the current block.

Clause 14B. The method of clause 1B, further comprising encoding the current block prior to decoding the current block.

Clause 15B. A device for decoding video data, the device comprising: a memory configured to store video data; and one or more processors implemented in circuitry and configured to: determine merge mode information for a current block of the video data, the merge mode information indicating that motion information for a current block is to be predicted using a first predictor motion vector and a second predictor motion vector; determine a first motion vector difference (MVD) for the first predictor motion vector and a second MVD for the second predictor motion vector, the second MVD being different than the first MVD; form a first motion vector, the first motion vector corresponding to a combination of the first motion vector predictor and the first MVD; form a second motion vector, the second motion vector corresponding to a combination of the second motion vector predictor and the second MVD; generate a prediction block using the first motion vector and the second motion vector; and decode the current block using the prediction block.

Clause 16B. The device of clause 15B, wherein the one or more processors are configured to determine that the second MVD is zero-valued.

Clause 17B. The device of clause 15B, wherein to determine the first MVD, the one or more processors are configured to decode a first offset index representing a magnitude for the first MVD, and wherein to determine the second MVD, the one or more processors are configured to decode a second offset index representing a magnitude for the second MVD.

Clause 18B. The device of clause 17B, wherein to determine the first MVD, the one or more processors are further configured to decode a first direction index indicating a direction for the first MVD, and wherein to determine the second MVD, the one or more processors are further configured to decode a second direction index indicating a direction for the second MVD.

Clause 19B. The device of clause 17B, wherein the one or more processors are further configured to decode a direction index representing a first direction for the first MVD and a second direction for the second MVD.

Clause 20B. The device of clause 19B, wherein when the first predictor motion vector refers to a first reference picture in a first reference picture list and the second predictor motion vector refers to a second reference picture in a second reference picture list, the first direction is opposite of the second direction.

Clause 21B. The device of clause 19B, wherein when the first predictor motion vector refers to a first reference picture in a first reference picture list and the second predictor motion vector refers to a second reference picture in the first reference picture list, the first direction is equal to the second direction.

Clause 22B. The device of clause 15B, wherein the one or more processors are further configured to code a value for a coding unit (CU)-level syntax element of the current block indicating that the second MVD is to be decoded.

Clause 23B. The device of clause 15B, wherein to determine the first MVD, the one or more processors are configured to decode a first x-component and a first y-component of the first MVD, and wherein to determine the second MVD, the one or more processors are configured to decode a second x-component and a second y-component of the second MVD.

Clause 24B. The device of clause 15B, wherein the merge mode information comprises a merge index having a value less than a threshold.

Clause 25B. The device of clause 15B, wherein the merge mode information comprises a first merge candidate index referring to a first entry in a geometric partition mode (GPM) candidate list and a second merge candidate index referring to a second entry in the GPM candidate list.

Clause 26B. The device of clause 15B, wherein the one or more processors are further configured to code a value of a syntax element indicating that uni-directional merge with MVD (MMVD) is not to be used for the current block.

Clause 27B. The device of clause 15B, further comprising a display configured to display the decoded video data.

Clause 28B. The device of clause 15B, wherein the device comprises one or more of a camera, a computer, a mobile device, a broadcast receiver device, or a set-top box.

Clause 29B. A computer-readable storage medium having stored thereon instructions that, when executed, cause a processor to: determine merge mode information for a current block, the merge mode information indicating that motion information for a current block is to be predicted using a first predictor motion vector and a second predictor motion vector; determine a first motion vector difference (MVD) for the first predictor motion vector and a second MVD for the second predictor motion vector, the second MVD being different than the first MVD; form a first motion vector, the first motion vector corresponding to a combination of the first motion vector predictor and the first MVD; form a second motion vector, the second motion vector corresponding to a combination of the second motion vector predictor and the second MVD; generate a prediction block using the first motion vector and the second motion vector; and decode the current block using the prediction block.

Clause 30B. A device for decoding video data, the device comprising: means for determining merge mode information for a current block, the merge mode information indicating that motion information for a current block is to be predicted using a first predictor motion vector and a second predictor motion vector; means for determining a first motion vector difference (MVD) for the first predictor motion vector and a second MVD for the second predictor motion vector, the second MVD being different than the first MVD; means for forming a first motion vector, the first motion vector corresponding to a combination of the first motion vector predictor and the first MVD; means for forming a second motion vector, the second motion vector corresponding to a combination of the second motion vector predictor and the second MVD; means for generating a prediction block using the first motion vector and the second motion vector; and means for decoding the current block using the prediction block.

Clause 31B. A method of decoding video data, the method comprising: determining merge mode information for a current block, the merge mode information indicating that motion information for a current block is to be predicted using a first predictor motion vector and a second predictor motion vector; determining a first motion vector difference (MVD) for the first predictor motion vector and a second MVD for the second predictor motion vector, the second MVD being different than the first MVD; forming a first motion vector, the first motion vector corresponding to a combination of the first motion vector predictor and the first MVD; forming a second motion vector, the second motion vector corresponding to a combination of the second motion vector predictor and the second MVD; generating a prediction block using the first motion vector and the second motion vector; and decoding the current block using the prediction block.

Clause 32B. The method of clause 31B, wherein determining the second MVD comprises determining that the second MVD is zero-valued.

Clause 33B. The method of clause 31B, wherein determining the first MVD comprises decoding a first offset index representing a magnitude for the first MVD, and wherein determining the second MVD comprises decoding a second offset index representing a magnitude for the second MVD.

Clause 34B. The method of clause 33B, wherein determining the first MVD further comprises decoding a first direction index indicating a direction for the first MVD, and wherein determining the second MVD further comprises decoding a second direction index indicating a direction for the second MVD.

Clause 35B. The method of clause 33B, further comprising decoding a direction index representing a first direction for the first MVD and a second direction for the second MVD.

Clause 36B. The method of clause 35B, wherein when the first predictor motion vector refers to a first reference picture in a first reference picture list and the second predictor motion vector refers to a second reference picture in a second reference picture list, the first direction is opposite of the second direction.

Clause 37B. The method of clause 35B, wherein when the first predictor motion vector refers to a first reference picture in a first reference picture list and the second predictor motion vector refers to a second reference picture in the first reference picture list, the first direction is equal to the second direction.

Clause 38B. The method of clause 31B, wherein determining the first MVD comprises decoding a first x-component and a first y-component of the first MVD, and wherein determining the second MVD comprises decoding a second x-component and a second y-component of the second MVD.

Clause 39B. The method of any of clauses 31-38B, further comprising coding a value for a syntax element indicating that the second MVD is to be decoded.

Clause 40B. The method of clause 39B, wherein the syntax element is a coding unit (CU)-level syntax element of the current block.

Clause 41B. The method of any of clauses 31-40B, wherein the merge mode information comprises a merge index having a value less than a threshold.

Clause 42B. The method of clause 31B, wherein the merge mode information comprises a first merge candidate index referring to a first entry in a geometric partition mode (GPM) candidate list and a second merge candidate index referring to a second entry in the GPM candidate list.

Clause 43B. The method of any of clauses 31-42B, further comprising coding a value of a syntax element indicating that uni-directional merge with MVD (MMVD) is not to be used for the current block.

Clause 44B. The method of any of clauses 31-43B, further comprising encoding the current block prior to decoding the current block.

Clause 45B. A device for decoding video data, the device comprising: a memory configured to store video data; and one or more processors implemented in circuitry and configured to: determine merge mode information for a current block of the video data, the merge mode information indicating that motion information for a current block is to be predicted using a first predictor motion vector and a second predictor motion vector; determine a first motion vector difference (MVD) for the first predictor motion vector and a second MVD for the second predictor motion vector, the second MVD being different than the first MVD; form a first motion vector, the first motion vector corresponding to a combination of the first motion vector predictor and the first MVD; form a second motion vector, the second motion vector corresponding to a combination of the second motion vector predictor and the second MVD; generate a prediction block using the first motion vector and the second motion vector; and decode the current block using the prediction block.

Clause 46B. The device of clause 45B, wherein the one or more processors are configured to determine that the second MVD is zero-valued.

Clause 47B. The device of clause 45B, wherein to determine the first MVD, the one or more processors are configured to decode a first offset index representing a magnitude for the first MVD, and wherein to determine the second MVD, the one or more processors are configured to decode a second offset index representing a magnitude for the second MVD.

Clause 48B. The device of clause 47B, wherein to determine the first MVD, the one or more processors are further configured to decode a first direction index indicating a direction for the first MVD, and wherein to determine the second MVD, the one or more processors are further configured to decode a second direction index indicating a direction for the second MVD.

Clause 49B. The device of clause 47B, wherein the one or more processors are further configured to decode a direction index representing a first direction for the first MVD and a second direction for the second MVD.

Clause 50B. The device of clause 49B, wherein when the first predictor motion vector refers to a first reference picture in a first reference picture list and the second predictor motion vector refers to a second reference picture in a second reference picture list, the first direction is opposite of the second direction.

Clause 51B. The device of clause 49B, wherein when the first predictor motion vector refers to a first reference picture in a first reference picture list and the second predictor motion vector refers to a second reference picture in the first reference picture list, the first direction is equal to the second direction.

Clause 52B. The device of clause 45B, wherein to determine the first MVD, the one or more processors are configured to decode a first x-component and a first y-component of the first MVD, and wherein to determine the second MVD, the one or more processors are configured to decode a second x-component and a second y-component of the second MVD.

Clause 53B. The device of any of clauses 45-52B, wherein the one or more processors are further configured to code a value for a coding unit (CU)-level syntax element of the current block indicating that the second MVD is to be decoded.

Clause 54B. The device of any of clauses 45-53B, wherein the merge mode information comprises a merge index having a value less than a threshold.

Clause 55B. The device of clause 45B, wherein the merge mode information comprises a first merge candidate index referring to a first entry in a geometric partition mode (GPM) candidate list and a second merge candidate index referring to a second entry in the GPM candidate list.

Clause 56B. The device of any of clauses 45-55B, wherein the one or more processors are further configured to code a value of a syntax element indicating that uni-directional merge with MVD (MMVD) is not to be used for the current block.

Clause 57B. The device of any of clauses 45-56B, further comprising a display configured to display the decoded video data.

Clause 58B. The device of any of clauses 45-57B, wherein the device comprises one or more of a camera, a computer, a mobile device, a broadcast receiver device, or a set-top box.

Clause 59B. A computer-readable storage medium having stored thereon instructions that, when executed, cause a processor to: determine merge mode information for a current block, the merge mode information indicating that motion information for a current block is to be predicted using a first predictor motion vector and a second predictor motion vector; determine a first motion vector difference (MVD) for the first predictor motion vector and a second MVD for the second predictor motion vector, the second MVD being different than the first MVD; form a first motion vector, the first motion vector corresponding to a combination of the first motion vector predictor and the first MVD; form a second motion vector, the second motion vector corresponding to a combination of the second motion vector predictor and the second MVD; generate a prediction block using the first motion vector and the second motion vector; and decode the current block using the prediction block.

Clause 60B. A device for decoding video data, the device comprising: means for determining merge mode information for a current block, the merge mode information indicating that motion information for a current block is to be predicted using a first predictor motion vector and a second predictor motion vector; means for determining a first motion vector difference (MVD) for the first predictor motion vector and a second MVD for the second predictor motion vector, the second MVD being different than the first MVD; means for forming a first motion vector, the first motion vector corresponding to a combination of the first motion vector predictor and the first MVD; means for forming a second motion vector, the second motion vector corresponding to a combination of the second motion vector predictor and the second MVD; means for generating a prediction block using the first motion vector and the second motion vector; and means for decoding the current block using the prediction block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of decoding video data, the method comprising:
   determining merge mode information for a current block that is to be bi-predicted without geometric partitioning, the merge mode information indicating that motion information for the current block is to be predicted using a first predictor motion vector and a second predictor motion vector;
   decoding a first distance offset and a first direction index for the first predictor motion vector, the first distance offset and the first direction index defining a first motion vector difference (MVD) for the first predictor motion vector;
   decoding a second distance offset and a second direction index for the second predictor motion vector, the second distance offset and the second direction index defining a second MVD for the second predictor motion vector;
   forming a first motion vector, the first motion vector corresponding to a combination of the first predictor motion vector and the first MVD;
   forming a first intermediate prediction block from a first reference block identified by the first motion vector, the first intermediate prediction block including values corresponding to each sample of the current block;
   forming a second motion vector, the second motion vector corresponding to a combination of the second predictor motion vector and the second MVD;
   forming a second intermediate prediction block from a second reference block identified by the second motion vector, the second intermediate prediction block including values corresponding to each sample of the current block;
   generating a prediction block using the first motion vector and the second motion vector, including averaging the values of the first intermediate prediction block and the values of the second intermediate prediction block on a sample-by-sample basis to form predicted values corresponding to each sample of the current block; and
   decoding the current block using the prediction block.

2. The method of claim 1, further comprising determining that the second MVD is zero-valued.

3. The method of claim 1, further comprising:
   decoding a first offset index representing a magnitude for the first MVD; and
   decoding a second offset index representing a magnitude for the second MVD.

4. The method of claim 1, further comprising coding a value for a syntax element indicating that the second MVD is to be decoded.

5. The method of claim 4, wherein the syntax element is a coding unit (CU)-level syntax element of the current block.

6. The method of claim 1, wherein the merge mode information comprises a merge index having a value less than a threshold.

7. The method of claim 1, further comprising coding a value of a syntax element indicating that uni-directional merge with MVD (MMVD) is not to be used for the current block.

8. The method of claim 1, further comprising encoding the current block prior to decoding the current block.

9. The method of claim 1, wherein averaging comprises weighted averaging the values of the first intermediate prediction block and the values of the second intermediate prediction block on the sample-by-sample basis.

10. A device for decoding video data, the device comprising:
    a memory configured to store video data; and
    a processing system comprising one or more processors implemented in circuitry, the processing system being configured to:
    determine merge mode information for a current block of the video data that is to be bi-predicted without geometric partitioning, the merge mode information indicating that motion information for the current block is to be predicted using a first predictor motion vector and a second predictor motion vector;
    decode a first distance offset and a first direction index for the first predictor motion vector, the first distance offset and the first direction index defining a first motion vector difference (MVD) for the first predictor motion vector;
    decode a second distance offset and a second direction index for the second predictor motion vector, the second distance offset and the second direction index defining a second MVD for the second predictor motion vector;
    form a first motion vector, the first motion vector corresponding to a combination of the first predictor motion vector and the first MVD;
    form a first intermediate prediction block from a first reference block identified by the first motion vector, the first intermediate prediction block including values corresponding to each sample of the current block;
    form a second motion vector, the second motion vector corresponding to a combination of the second predictor motion vector and the second MVD;
    form a second intermediate prediction block from a second reference block identified by the second motion vector, the second intermediate prediction block including values corresponding to each sample of the current block;
    generate a prediction block using the first motion vector and the second motion vector, wherein to generate the prediction block, the processing system is configured to average the values of the first intermediate prediction block and the values of the second intermediate prediction block on a sample-by-sample basis to form predicted values corresponding to each sample of the current block; and
    decode the current block using the prediction block.

11. The device of claim 10, wherein the processing system is configured to determine that the second MVD is zero-valued.

12. The device of claim 10, wherein the processing system is further configured to:
    decode a first offset index representing a magnitude for the first MVD; and
    decode a second offset index representing a magnitude for the second MVD.

13. The device of claim 10, wherein the processing system is further configured to code a value for a coding unit (CU)-level syntax element of the current block indicating that the second MVD is to be decoded.

14. The device of claim 10, wherein the merge mode information comprises a merge index having a value less than a threshold.

15. The device of claim 10, wherein the processing system is further configured to code a value of a syntax element indicating that uni-directional merge with MVD (MMVD) is not to be used for the current block.

16. The device of claim 10, further comprising a display configured to display the decoded video data.

17. The device of claim 10, wherein the device comprises one or more of a camera, a computer, a mobile device, a broadcast receiver device, or a set-top box.

18. The device of claim 10, wherein to generate the prediction block, the processing system is configured to calculate weighted averages of the values of the first intermediate prediction block and the values of the second intermediate prediction block on a sample-by-sample basis to form predicted values for each sample of the current block.

19. A non-transitory computer-readable storage medium having stored thereon instructions that, when executed, cause a processing system to:
- determine merge mode information for a current block that is to be bi-predicted without geometric partitioning, the merge mode information indicating that motion information for a current block is to be predicted using a first predictor motion vector and a second predictor motion vector;
- decode a first distance offset and a first direction index for the first predictor motion vector, the first distance offset and the first direction index defining a first motion vector difference (MVD) for the first predictor motion vector;
- decode a second distance offset and a second direction index for the second predictor motion vector, the second distance offset and the second direction index defining a second MVD for the second predictor motion vector;
- form a first motion vector, the first motion vector corresponding to a combination of the first predictor motion vector and the first MVD;
- form a first intermediate prediction block from a first reference block identified by the first motion vector, the first intermediate prediction block including values corresponding to each sample of the current block;
- form a second motion vector, the second motion vector corresponding to a combination of the second predictor motion vector and the second MVD;
- form a second intermediate prediction block from a second reference block identified by the second motion vector, the second intermediate prediction block including values corresponding to each sample of the current block;
- generate a prediction block using the first motion vector and the second motion vector, wherein the instructions that cause the processing system to generate the prediction block comprise instructions that cause the processing system to average the values of the first intermediate prediction block and the values of the second intermediate prediction block on a sample-by-sample basis to form predicted values corresponding to each sample of the current block; and
- decode the current block using the prediction block.

20. A device for decoding video data, the device comprising:
- means for determining merge mode information for a current block that is to be bi-predicted without geometric partitioning, the merge mode information indicating that motion information for a current block is to be predicted using a first predictor motion vector and a second predictor motion vector;
- means for decoding a first distance offset and a first direction index for the first predictor motion vector, the first distance offset and the first direction index defining a first motion vector difference (MVD) for the first predictor motion vector;
- means for decoding a second distance offset and a second direction index for the second predictor motion vector, the second distance offset and the second direction index defining a second MVD for the second predictor motion vector;
- means for forming a first motion vector, the first motion vector corresponding to a combination of the first predictor motion vector and the first MVD;
- means for forming a first intermediate prediction block from a first reference block identified by the first motion vector, the first intermediate prediction block including values corresponding to each sample of the current block;
- means for forming a second motion vector, the second motion vector corresponding to a combination of the second predictor motion vector and the second MVD;
- means for forming a second intermediate prediction block from a second reference block identified by the second motion vector, the second intermediate prediction block including values corresponding to each sample of the current block;
- means for generating a prediction block using the first motion vector and the second motion vector, wherein the means for generating the prediction block comprise means for averaging the values of the first intermediate prediction block and the values of the second intermediate prediction block on a sample-by-sample basis to form predicted values corresponding to each sample of the current block; and
- means for decoding the current block using the prediction block.

* * * * *